United States Patent
Yang et al.

(10) Patent No.: US 11,483,194 B2
(45) Date of Patent: Oct. 25, 2022

(54) PARTIAL DISCRETE FOURIER TRANSFORM-BASED SEQUENCE DESIGN AND APPLICATION TO RANDOM ACCESS CHANNEL PREAMBLES

(71) Applicant: QUALCOMM Incorporated, San Diego, CA (US)

(72) Inventors: Wei Yang, San Diego, CA (US); Suhas Subramanya Kowshik, Cambridge, MA (US); Joseph Binamira Soriaga, San Diego, CA (US); Jing Lei, San Diego, CA (US); Seyong Park, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 17/010,402

(22) Filed: Sep. 2, 2020

(65) Prior Publication Data

US 2021/0091990 A1    Mar. 25, 2021

Related U.S. Application Data

(60) Provisional application No. 62/904,827, filed on Sep. 24, 2019.

(51) Int. Cl.
*H04L 27/26* (2006.01)
*H04L 1/00* (2006.01)
(Continued)

(52) U.S. Cl.
CPC ........ *H04L 27/2692* (2013.01); *H04L 1/0071* (2013.01); *H04L 27/0014* (2013.01); *H04W 74/0833* (2013.01); *H04L 2027/0095* (2013.01)

(58) Field of Classification Search
CPC . H04W 74/0833; H04J 13/10; H04L 27/2613; H04L 27/2636
(Continued)

(56) References Cited

U.S. PATENT DOCUMENTS

2008/0298502 A1* 12/2008 Xu ................. H04L 5/0053
375/299

OTHER PUBLICATIONS

Bockelmann C, et al., "Towards Massive Connectivity Support for Scalable mMTC Communications in 5G Networks", arxiv.org, Cornell University Library, 201 Olin Library Cornell University Ithaca, NY 14853, Apr. 5, 2018 (Apr. 5, 2018), XP080867782, pp. 1-20.

(Continued)

*Primary Examiner* — Sam K Ahn
*Assistant Examiner* — Gina M Mckie
(74) *Attorney, Agent, or Firm* — Holland & Hart LLP

(57) ABSTRACT

Methods, systems, and devices for wireless communications are described. A user equipment (UE) may transmit a random access preamble to a base station as part of a two-step random access procedure. The UE may generate the preamble by identifying a discrete Fourier transform (DFT) matrix and generating a set of sequences based on the DFT matrix. Each sequence of the set of sequences may be generated by selecting a column of the DFT matrix and performing deterministic sampling of respective entries from the selected column in accordance with a sampling function. The UE may then select a sequence from the set of sequences based on generating the set of sequence. The UE may transmit the selected sequence to a wireless device (e.g., a base station).

30 Claims, 13 Drawing Sheets

(51) Int. Cl.
*H04L 27/00* (2006.01)
*H04W 74/08* (2009.01)

(58) Field of Classification Search
USPC .......................................................... 714/726
See application file for complete search history.

(56) References Cited

OTHER PUBLICATIONS

International Search Report and Written Opinion—PCT/US2020/049188—ISAEPO—dated Dec. 10, 2020 (194897WO).
Wang X., et al., "Deterministic Convolutional Compressed Sensing Matrices", Finite Fields And Their Applications, Academic Press, San Diego, CA, US, vol. 42, Jul. 29, 2016 (Jul. 29, 2016), pp. 102-117, XP029743349, ISSN: 1071-5797, DOI: 10.1016/J.FFA.2016.07.002.

* cited by examiner

PARTIAL DISCRETE FOURIER TRANSFORM-BASED SEQUENCE DESIGN AND APPLICATION TO RANDOM ACCESS CHANNEL PREAMBLES

CROSS REFERENCE

The present application for patent claims the benefit of U.S. Provisional Patent Application No. 62/904,827 by Yang et al., entitled "PARTIAL DISCRETE FOURIER TRANSFORM-BASED SEQUENCE DESIGN AND APPLICATION TO RANDOM ACCESS CHANNEL PREAMBLES," filed Sep. 24, 2019, assigned to the assignee hereof, and expressly incorporated by reference in its entirety herein.

FIELD OF TECHNOLOGY

The following relates generally to wireless communications and more specifically to partial discrete Fourier transform (DFT)-based sequence design and application to random access channel preambles.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless devices (such as UEs and base stations) may communicate using sequence-based transmissions. As an example, a UE may transmit a random access preamble to a base station, where the random access preamble may be based on a Zadoff-Chu (ZC) sequence. However, in some cases, techniques used for generating sequences may limit a number of wireless devices that may communicate at the same time using distinct sequences (e.g., during a same random access occasion, using the random access example).

SUMMARY

The described techniques relate to improved methods, systems, devices, and apparatuses that support partial discrete Fourier transform (DFT)-based sequence design and application to random access channel preambles. Generally, the described techniques provide techniques for a wireless device, (such as a user equipment (UE) or base station) to generate and transmit sequence-based messages, where the sequence is based on a DFT matrix or inverse discrete Fourier transform (IDFT) matrix. In such cases, a wireless device may identify a DFT matrix (or IDFT matrix) and generate a set of sequences based on the DFT matrix. Each sequence of the set of sequences may be generated by selecting a column of the DFT matrix and then using a sampling function to perform deterministic sampling of respective entries from the selected column. Here, the sampling function may include a quadratic-type sampling function, a cubic-type sampling function, a Fibonacci-type sampling function, or the like. The wireless device may then select a sequence from the set of sequences based on generating the set of sequences, and the wireless device may transmit the selected sequence to another wireless device.

The DFT-based sequence generated by the wireless device may be used for various communications between two or more devices. For instance, a UE may generate a DFT-based sequence for a random access preamble as part of a random access procedure. In such cases, the UE may generate the DFT-based sequence for use as a random access preamble sequence, and the UE may transmit the random access preamble to a base station (e.g., as part of a two-step random access procedure or a four step random access procedure). The DFT-based sequence may also be used for other sequence-based transmissions. In any case, the DFT-base sequence design may enable a greater number of unique sequences across multiple wireless devices (as compared to, for example, Zadoff-Chu (ZC) sequences).

A method of wireless communication is described. The method may include identifying a DFT matrix, generating a set of sequences based on the DFT matrix, where each sequence of the set of sequences is generated by selecting a column of the DFT matrix and performing deterministic sampling of respective entries from the selected column in accordance with a sampling function, selecting a sequence from the set of sequences based on generating the set of sequences, and transmitting the selected sequence to a wireless device.

An apparatus for wireless communication is described. The apparatus may include a processor, memory coupled with the processor, and instructions stored in the memory. The instructions may be executable by the processor to cause the apparatus to identify a DFT matrix, generate a set of sequences based on the DFT matrix, where each sequence of the set of sequences is generated by selecting a column of the DFT matrix and performing deterministic sampling of respective entries from the selected column in accordance with a sampling function, select a sequence from the set of sequences based on generating the set of sequences, and transmit the selected sequence to a wireless device.

Another apparatus for wireless communication is described. The apparatus may include means for identifying a DFT matrix, generating a set of sequences based on the DFT matrix, where each sequence of the set of sequences is generated by selecting a column of the DFT matrix and performing deterministic sampling of respective entries from the selected column in accordance with a sampling function, selecting a sequence from the set of sequences based on generating the set of sequences, and transmitting the selected sequence to a wireless device.

A non-transitory computer-readable medium storing code for wireless communication is described. The code may include instructions executable by a processor to identify a DFT matrix, generate a set of sequences based on the DFT matrix, where each sequence of the set of sequences is generated by selecting a column of the DFT matrix and performing deterministic sampling of respective entries from the selected column in accordance with a sampling function, select a sequence from the set of sequences based on generating the set of sequences, and transmit the selected sequence to a wireless device.

Some examples of the method, apparatuses, and non-transitory computer-readable medium described herein may further include operations, features, means, or instructions for generating a set of integers for each sequence of the set of sequences using the sampling function, and where the set of integers substantially includes an equal number of even integers and odd integers.

Some examples of the method, apparatuses, and non-transitory computer-readable medium described herein may further include operations, features, means, or instructions for identifying that the sampling function includes a quadratic sampling function having the form $$f(n) = \left(a \cdot \frac{n(n+b)}{2} + c\right)$$

mod M, where M is an order of the DFT matrix, and where a and b are each a positive odd number and c is a non-negative integer.

Some examples of the method, apparatuses, and non-transitory computer-readable medium described herein may further include operations, features, means, or instructions for identifying that the sampling function includes a cubic sampling function having the form $$f(n) = \left(a \frac{n(n+1)(2n+1)}{2} + b\right)$$

mod M, where M includes an order of the DFT matrix, and where a is a positive odd number and b is a non-negative integer.

Some examples of the method, apparatuses, and non-transitory computer-readable medium described herein may further include operations, features, means, or instructions for identifying that the sampling function includes a Fibonacci-type sampling function having the form $f(n)=(f(n-1)+f(n-2))$ mod M, where M includes an order of the DFT matrix, and where $f(0)$ and $f(1)$ of the sampling function include a pair of integers, a first integer of the pair being even and a second integer of the pair being odd.

Some examples of the method, apparatuses, and non-transitory computer-readable medium described herein may further include operations, features, means, or instructions for determining an order of the DFT matrix based on a number of sequences in the set of sequences, where the set of sequences is based on the order of the DFT matrix.

Some examples of the method, apparatuses, and non-transitory computer-readable medium described herein may further include operations, features, means, or instructions for performing sequence masking for each sequence of the set of sequences, where the selected sequence may be modified in accordance with the sequence masking prior to transmission.

In some examples of the method, apparatuses, and non-transitory computer-readable medium described herein, performing the sequence masking may include operations, features, means, or instructions for multiplying each sequence with a masking sequence having a same length as each corresponding sequence.

In some examples of the method, apparatuses, and non-transitory computer-readable medium described herein, the masking sequence modifies a peak-to-average power ratio of each sequence in the set of sequences from a first value to a second value that may be less than the first value.

In some examples of the method, apparatuses, and non-transitory computer-readable medium described herein, the set of sequences includes a set of cell-specific sequences based on the sequence masking, where selecting the sequence may be based on communicating with the wireless device in a cell corresponding to the set of cell-specific sequences.

In some examples of the method, apparatuses, and non-transitory computer-readable medium described herein, transmitting the selected sequence may include operations, features, means, or instructions for transmitting the selected sequence as part of a preamble for a random access procedure.

In some examples of the method, apparatuses, and non-transitory computer-readable medium described herein, the random access procedure may be a two-step random access procedure.

In some examples of the method, apparatuses, and non-transitory computer-readable medium described herein, the random access procedure may be a four-step random access procedure.

Some examples of the method, apparatuses, and non-transitory computer-readable medium described herein may further include operations, features, means, or instructions for performing interleaving of each sequence of the set of sequences, where the selected sequence may be modified in accordance with the interleaving prior to transmission. In some examples of the method, apparatuses, and non-transitory computer-readable medium described herein, the interleaving includes block interleaving.

In some examples of the method, apparatuses, and non-transitory computer-readable medium described herein, the interleaving may be performed using an interleaver having a size that may be equal to a prime number, where the prime number may be selected based on a length of each sequence.

In some examples of the method, apparatuses, and non-transitory computer-readable medium described herein, the interleaving modifies a peak-to-average power ratio of each sequence in the set of sequences from a first value to a second value that may be less than the first value.

In some examples of the method, apparatuses, and non-transitory computer-readable medium described herein, transmitting the selected sequence may include operations, features, means, or instructions for transmitting the selected sequence as a frequency domain sequence, a time domain sequence, or a combination thereof.

In some examples of the method, apparatuses, and non-transitory computer-readable medium described herein, generating the set of sequences based on the DFT matrix may include operations, features, means, or instructions for identifying a set of columns of the DFT matrix, and selecting, from the set of columns, a subset of columns for generating the set of sequences, where each sequence of the set of sequences may be generated using a column from the subset of columns.

In some examples of the method, apparatuses, and non-transitory computer-readable medium described herein, the DFT matrix includes a square matrix, and where a number of sequences in the set of sequences may be less than or equal to an order of the DFT matrix. In some examples of the method, apparatuses, and non-transitory computer-readable medium described herein, the DFT matrix includes an IDFT matrix.

DETAILED DESCRIPTION

Figure 1:
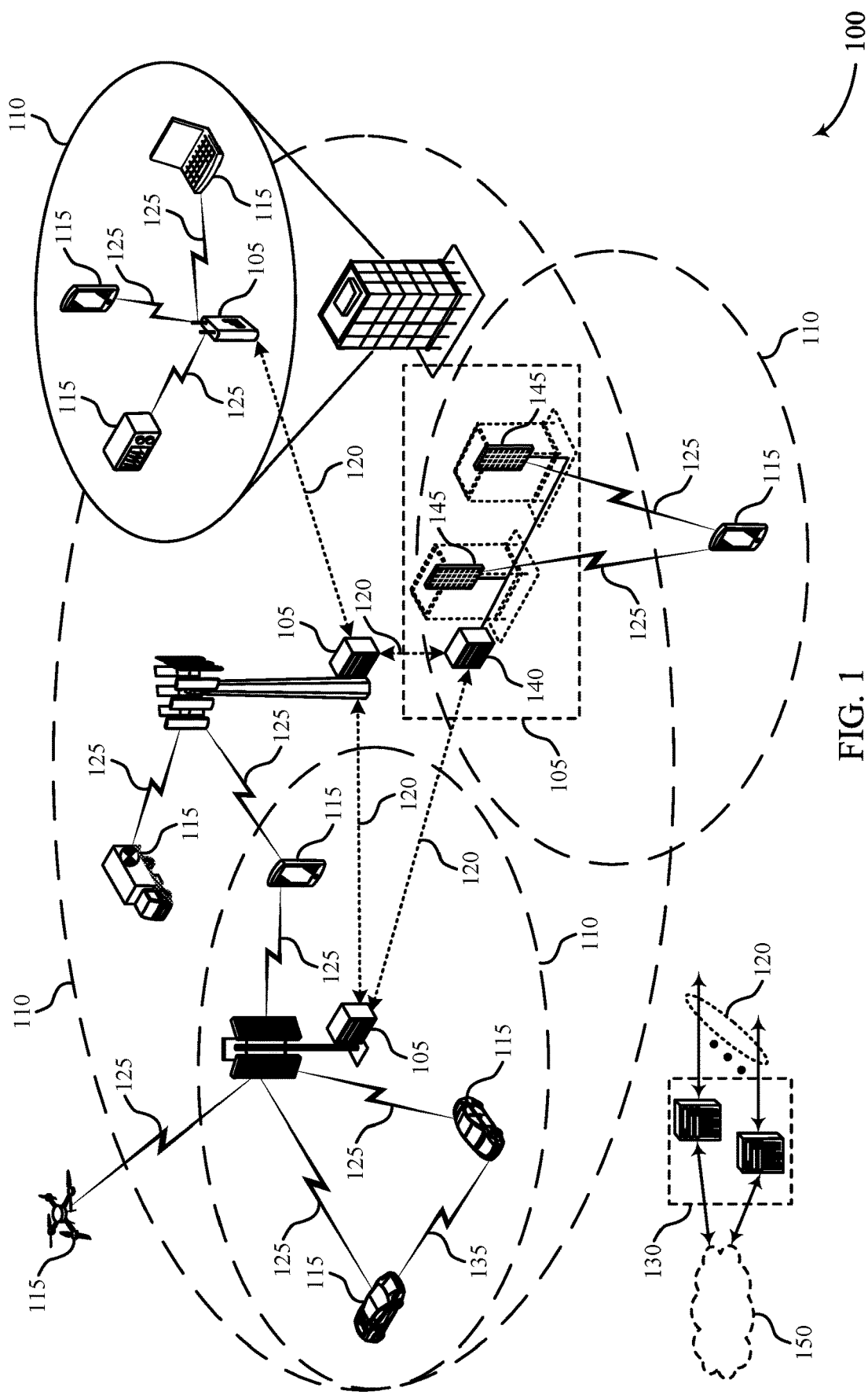
FIG. 1 illustrates an example of a wireless communications system that supports partial discrete Fourier transform (DFT)-based sequence design and application to random access channel preambles in accordance with aspects of the present disclosure.

Some wireless communications systems may support sequence-based transmissions. A sequence-based transmission may include a wireless transmission that includes a sequence that is generated by a transmitting device, and the sequence may be used by the transmitting device to differentiate its communications from transmissions by other devices. Various sequences may be generated for wireless transmission to another device, where various sequences may have properties such that there is limited correlation between respective sequences, thereby enabling efficient detection of distinct sequences at the receiving device. An example of this may include Zadoff-Chu (ZC) sequences, where cyclically shifted versions of a ZC base sequence may generate a number of different sequences that may be included in a transmission. For instance, the ZC sequence may be used for random access procedures.

A user equipment (UE) may determine to connect to a new cell or base station based on a variety of communication parameters, movement of the UE, or the initiation of a handover procedure. To initiate communication, the UE may transmit a random access channel (RACH) preamble to begin a random access procedure. The transmission of the preamble sequence may occur in a physical random access channel (PRACH), and the preamble may be transmitted as part of a multiple step random access process. The random access process may be an example of a two-step random access process, a four step random access process, or another type of random access process.

In some cases, the use of ZC sequences may restrict a number of different UEs that may concurrently perform a random access procedure, for example, during the same RACH occasion (RO). In particular, ZC sequences may have a limited capacity for use in sequence generation, because they may constrain the length and the root of the sequence to co-prime values. Because of this constraint, in some examples, there may be a maximum number of preamble sequences that may be generated by one or more UEs for a particular RO (e.g., 64 sequences). This limit on the number of possible sequences (for a particular RO) may limit the number of UEs that may use the RO because there may be a high likelihood that two or more UEs may generate random access preambles with the same sequences. Another type of sequence that enables for a greater number of devices to transmit uncorrelated sequences may be desirable, for example, for RACH procedures and for other sequences-based transmissions.

As described herein, a scalable partial discrete Fourier transform (DFT) or inverse discrete Fourier transform (IDFT)-based sequence design may be used. A DFT/IDFT generation method may be scalable for a large number of users and be a practical implementation. DFT/IDFT sequence generation may be used for four step random access procedures, two-step random access procedures, and other random access procedures. The DFT/IDFT sequence generation may utilize deterministic sampling of rows in DFT/IDFT matrices. The rows in the matrices may correspond to sequence length N, and there may be M number of sequences. A sampling function may be used to generate the sequences of the set of sequences (e.g., via deterministic sampling). In some cases, the sampling function may be set or configured such that the set of integers associated with the sequences has roughly equal number of odd and even numbers. Based on DFT/IDFT sequence generation and the sampling functions described herein, the sequences generated and available for selection by UEs in preamble generation may have improved cross correlation properties. The sequences may also have low restricted isometry constraints (MC), which may be comparable to random partial DFT/IDFT matrices.

Further, sequence-masking and interleaving techniques may be used to generate cell-specific sequences and sequences having a low peak-to-average power ratio (PAPR). For example, a first cell may use a first masking sequence and a second cell may use a second masking sequence. The preambles generated based on DFT/IDFT sequence generation may be transmitted in either time domain or frequency domain, which may lead to increased flexibility and increases efficiency in resource utilization. Further, the cell-specific sequences generated may be used for access operations, for example, by a UE transmitting a RACH preamble to a base station.

Aspects of the disclosure are initially described in the context of wireless communications systems. Aspects of the disclosure are then described with respect to matrix diagrams, process diagrams, and process flows. Aspects of the disclosure are further illustrated by and described with reference to apparatus diagrams, system diagrams, and flowcharts that relate to partial DFT-based sequence design and application to random access channel preambles.

FIG. 1 illustrates an example of a wireless communications system 100 that supports partial DFT-based sequence design and application to random access channel preambles in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported DFT size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS SSS, and the like) using multiple beams in a beam-sweeping manner through a cell coverage area. In some cases, PSS, SSS, and/or broadcast information (e.g., a physical broadcast channel (PBCH)) may be transmitted within different synchronization signal (SS) blocks on respective directional beams, where one or more SS blocks may be included within an SS burst.

After receiving the PSS and SSS, the UE 115 may receive a master information block (MIB), which may be transmitted in the PBCH. The MIB may contain system bandwidth information, an SFN, and a physical hybrid automatic repeat request (HARD) channel (PHICH) configuration. After decoding the MIB, the UE 115 may receive one or more SIBs. For example, SIB1 may contain cell access parameters and scheduling information for other Ms. Decoding SIB1 may enable the UE 115 to receive SIB2. SIB2 may contain radio resource control (RRC) configuration information related to RACH procedures, paging, PUCCH, PUSCH, power control, SRS, and cell barring.

After completing initial cell synchronization, a UE 115 may decode the MIB, SIB1 and SIB2 prior to accessing the network. The MIB may be transmitted on PBCH and may utilize the first 4 OFDMA symbols of the second slot of the first subframe of each radio frame. It may use the middle 6 RBs (72 subcarriers) in the frequency domain. The MIB carries a few important pieces of information for UE initial access, including downlink channel bandwidth in term of RBs, PHICH configuration (duration and resource assignment), and SFN. A new MIB may be broadcast every fourth radio frame (SFN mod 4=0) at and rebroadcast every frame (10 ms). Each repetition is scrambled with a different scrambling code. After reading a MIB (either a new version or a copy), the UE 115 may can try different phases of a scrambling code until it gets a successful cyclic redundancy check (CRC). The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase. After receiving the MIB, a UE 115 may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 includes access information, including cell identity information, and it may indicate whether a UE 115 is allowed to camp on a cell. SIB1 also includes cell selection information (or cell selection parameters). Additionally, SIB1 includes scheduling information for other Ms. SIB2 may be scheduled dynamically according to information in SIB1, and includes access information and parameters related to common and shared channels. The periodicity of SIB2 can be set to 8, 16, 32, 64, 128, 256 or 512 radio frames.

After the UE 115 decodes SIB2, it may transmit a RACH preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an uplink resource grant, a timing advance, and a temporary C-RNTI. The UE 115 may then transmit an RRC connection request along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

A UE 115 and base station 105, however, may be capable of participating in a two-step random access procedure. In a two-step random access procedure, the UE 115 may transmit an initial message to the base station 105. In some cases, multiple UEs 115 may each attempt to transmit separate message 1 (or message A) instances to the base station 105. The base station 105 may respond to the various UEs 115 with a message 2 (or message B). The downlink response message may be included in a physical downlink shared channel (PDSCH).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may transmit a random access preamble to a base station 105 as part of a two-step random access procedure. The UE 115 may generate the preamble by identifying a DFT/IDFT matrix, generating a set of sequences based on the DFT matrix. Each sequence of the set of sequences may be generated by selecting a column of the DFT matrix and performing deterministic sampling of respective entries from the selected column in accordance with a sampling function. The UE 115 may then select a sequence from the set of sequences based on generating the set of sequences. The UE 115 may transmit the select sequence to a base station 105. Although generally described with reference to random access procedures, the DFT/IDFT-based sequence may also be used for other types of sequence-based transmissions.

It is noted that the operations described herein as being performed by a UE 115 and base station 105 may be respectively performed by a UE 115, a base station 105, or another wireless device, and the described examples should not be construed as limiting. For instance, the operations shown as performed by a UE 115 may be performed by a base station 105 (or another wireless device), and the operations shown as performed by a base station 105 may likewise be performed by a UE 115 (or another wireless device).

Figure 2:
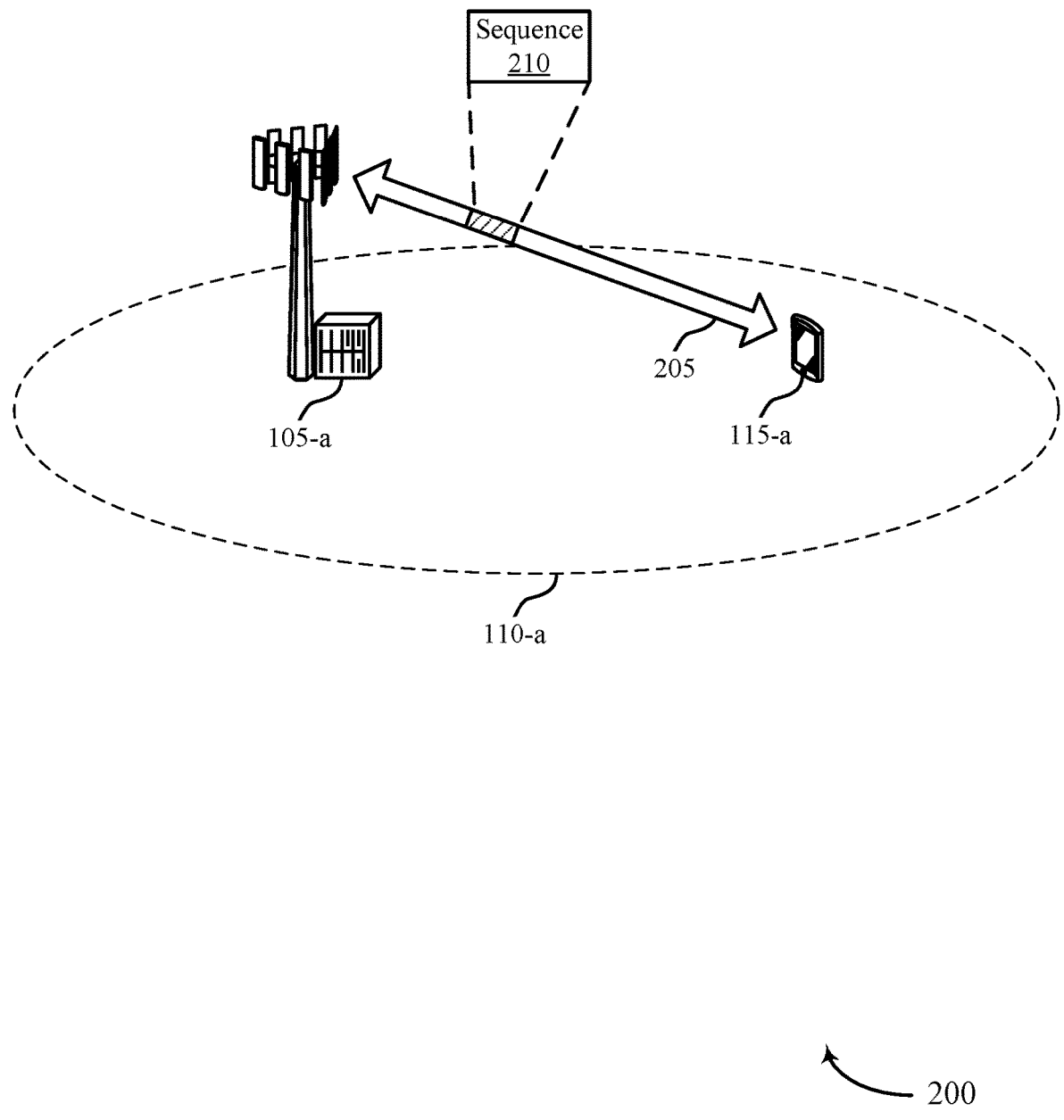
FIG. 2 illustrates an example of a wireless communications system that supports partial DFT-based sequence design and application to random access channel preambles in accordance with aspects of the present disclosure.

FIG. 2 illustrates an example of a wireless communications system 200 that supports partial DFT-based sequence design and application to random access channel preambles in accordance with aspects of the present disclosure. In some examples, wireless communications system 200 may implement aspects of wireless communications system 100. Wireless communications system 200 may include UE 115-a, which may be an example of a UE 115 as described with respect to wireless communications system 100. Wireless communications system 200 may also include a base station 105-a which may be an example of a base station 105 as described with respect to wireless communications system 100. UE 115-a may communicate with base station 105-a over communication link 205. Base station 105-a may serve coverage area 110-a.

UE 115-a may utilize a scalable partial DFT or IDFT matrix as a basis for sequence-based transmissions. A DFT/IDFT generation method may be scalable for a large number of users and be a practical implementation. As an example, the sequence may be generated for use in random access procedures, where DFT/IDFT sequence generation may be used for four-step random access procedures, two-step random access procedures, and other random access procedures. The DFT/IDFT-based sequence may also be used for other types of sequence-based transmissions.

When generating the sequence, UE 115-a may identify a DFT matrix (or an IDFT matrix) which may be used for sequence generation for the transmission of a random access preamble to base station 105-a as part of a random access procedure. The DFT matrix identified may be an example of a DFT/IDFT matrix as shown in matrix 300 as described with respect to FIG. 3.

UE 115-a may generate a set of sequences based on the identified DFT matrix. This may include selecting a column of the DFT matrix, and performing deterministic sampling of respective entries from the selected column. The rows in the matrices may correspond to sequence length N, and there may be M number of sequences, where $M=2^k$, $k \in \mathbb{N}$. A sampling function may be used to select the sequence from the set of sequences. The sampling function may be set such that the set has roughly equal number of odd and even numbers. UE 115-a may generate M sequences by selecting a DFT matrix of size M×M (e.g., of order M) and then sub-sample each row and column of the DFT matrix. Put another way, UE 115-a may determine the order of the DFT matrix based on a cardinality of the set of sequences, and the DFT matrix may be sampled for generating the set of sequences (e.g., which may include a number of sequences that correspond to an order of the DFT matrix).

There may be a number of different types of possible sampling functions. A sampling function may be a quadratic sampling function, a cubic sampling function, a Fibonacci-type sampling function, or another type of sampling function.

An example of a quadratic sampling function is:

$$f(n) = \left(a \cdot \frac{n(n+b)}{2} + c\right) \bmod M,$$

for $0 \leq n \leq N-1$
where a and b may be any positive odd number (e.g., 1, 3, 5), and c may be any non-negative integer (e.g., 0, 1, 2, 3).

An example of a cubic sampling function may be:

$$f(n) = \left(a \frac{n(n+1)(2n+1)}{2} + b\right) \bmod M$$

In this case, a may be a positive odd number (e.g., 1, 3, 5) and b may be a non-negative integer (e.g., 0, 1, 2).

An example of a Fibonacci-type sampling function may be:

$f(n)=f(n-1)+f(n-2) \bmod M$ for $2 \leq m \leq N-1$

In this case, $f(0)$ and $f(1)$ may be chosen such that $f(0)$ and $f(1)$ are a pair of integers that has one even and one odd number. For example, $f(0)=1$ and $f(1)=2$.

UE 115-a may select a sequence from the set of sequences generated by the sampling function. The selection may be random in some cases, or may be based on another function. UE 115-a may transmit the selected sequence 210 as part of a random access procedure over communication link 205. The transmission of sequence 210 may occur in RACH resources of the channel. Sequence 210 may be a part of a random access preamble transmitted by UE 115-a to initiate a random access procedure (e.g., a two-step random access procedure).

The DFT sequence 210 transmitted by UE 115-a may be detected at base station 105-a after base station 105-a receives the sequence 210 from UE 115-a. Base station 105-a may utilize single-user detection-based preamble detection. In this case, y may be the received signal of length N. To detect UE activity (i.e., to determine which sequences may be transmitted from UE 115-a and which sequences may have been transmitted by another UE 115) base station 105-a may compute the cross-correlation of y and each of the candidate preamble sequences $x_l$. The output of the sequences after the cross-correlation with the received signal y may be above a particular threshold. If A is an N×M matrix formed by stacking M sequences together, and where sequence xi is the $l^{th}$ column of A, then the algorithm may be equivalent to compute the matrix multiplication $A^H y$, and output the indices of the entries of the resulting length-M vector with a power (or magnitude) above a particular threshold.

As A may be taken from a particular DFT/IDFT matrix, the computation of $A^H y$ may be implemented using an inverse fast Fourier transform (IFFT) or a fast Fourier transform (FFT), which may be associated with less complexity than a matrix multiplication or cross-correlation computation. For example, to compute $A^H y$, y may be zero-padded with M–N zeros, such that y'∈ $\mathbb{C}^M$. Base station 105-a may permute the entries of y' in the inverse order of the sampling function $f(n)$. For example, y" may be constructed with y"$(f(n))$=y'(n). Base station 105-a may then take the IFFT or FFT of y" to yield $A^H y$ with a particular scaling. When the size of the matrix A is large (e.g., when M is in the order of several thousands or more), using IFFT or FFT may reduce the computational complexity of $A^H y$.

Based on DFT/IDFT sequence generation and the sampling functions described herein, the sequences generated and possible for selection by UEs 115 in preamble generation may have cross correlation properties that correspond to low likelihoods of interference, for example, between transmissions of different devices. The sequences may also have low RICs, which may be comparable to random partial DFT/IDFT matrices.

Further, sequence-masking techniques may be used to generate cell-specific sequences. For example, a UE 115 may operate according to a first cell A. The first cell A may use a making sequence $b_A$. Another UE 115 may operate according to a second cell B, which may use a masking sequence $b_B$. The masking sequence may therefore be applied to DFT matrices used by the respective UEs 115 such that sequences transmitted in RACH resources for a cell may be distinct to that cell.

Figure 3:
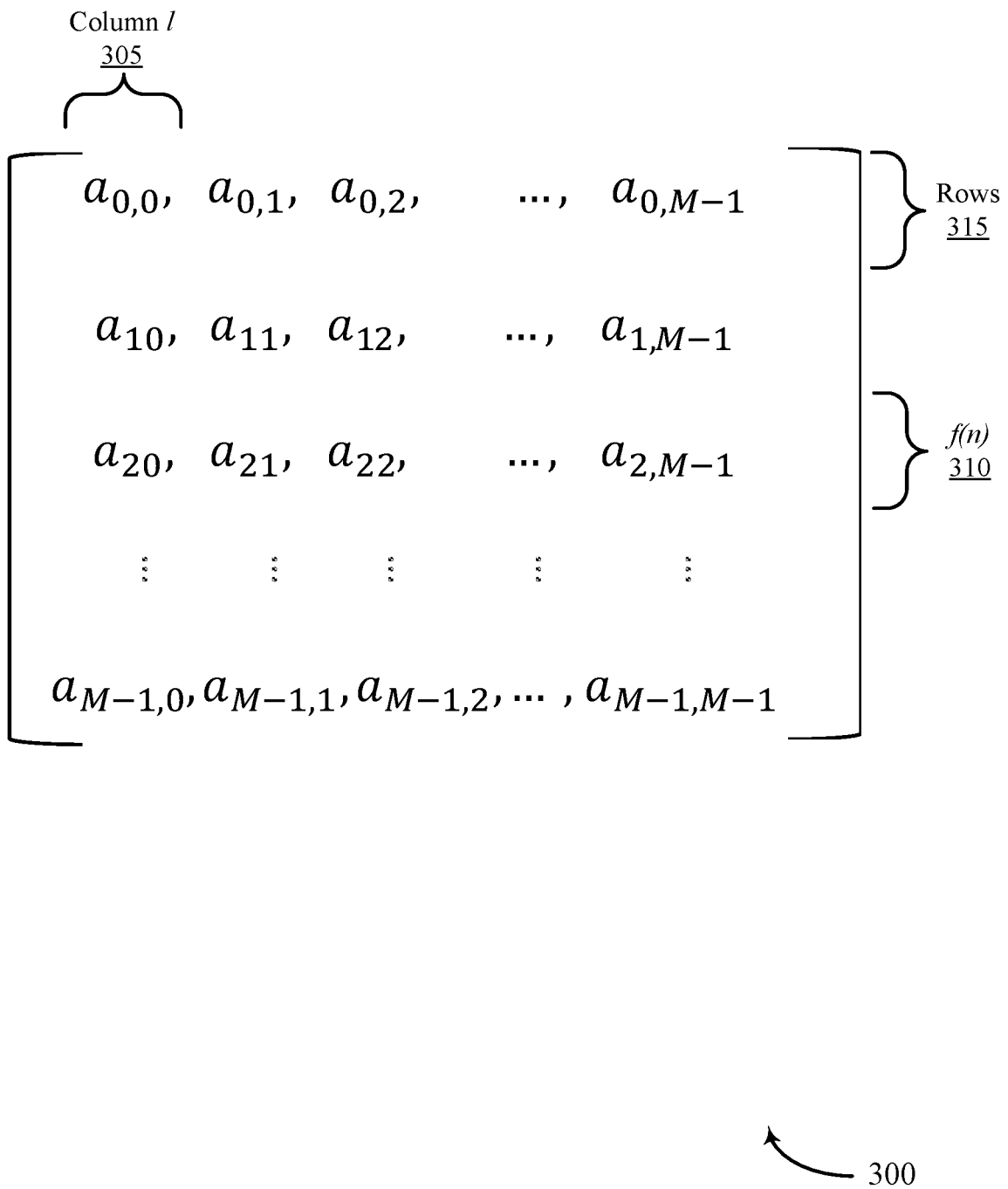
FIG. 3 illustrates an example of a matrix that supports partial DFT-based sequence design and application to random access channel preambles in accordance with aspects of the present disclosure.

FIG. 3 illustrates an example of a matrix 300 that supports partial DFT-based sequence design and application to random access channel preambles in accordance with aspects of the present disclosure. In some examples, matrix 300 may implement aspects of wireless communications systems 100 or 200. A UE 115 may utilize features of matrix 300 to generate and select a sequence for the transmission of a random access preamble as part of a two-step RACH procedure.

In a DFT matrix 300, the sequence length may be denoted as N and the preamble pool size (i.e., the number of sequences) may be denoted as M. For example, M=$2^k$, where k ∈ ℕ. In the edge case where, M≠$2^k$, the smallest power may be used that is larger than M and N. An example DFT matrix 300 may be M columns 1. 305 by M rows 315. The DFT matrix may have elements corresponding to:

$$A = (A_{n,m})_{n,m=0}^{M-1} \text{ with } A_{n,m} = \exp\left(-j\frac{2\pi mn}{M}\right)$$

Alternatively, an IDFT matrix (the inverse of DFT matrix 300) may correspond to:

$$B = (B_{n,m})_{n,m=0}^{M-1} \text{ with } B_{n,m} = \exp\left(j\frac{2\pi mn}{M}\right)$$

In both cases, the M sequences $x_l$, $0 \leq l \leq M-1$ may be chosen such that $x_l(n)=A_{f(n),l}$ for $0 \leq n \leq N-1$. In this case, $f(\cdot)$: $\{0, \ldots, N-1\} \rightarrow \{0, \ldots, M-1\}$ may denote the sampling function. In other cases, $x_l(n)=B_{f(n),l}$ may be used as the sequence, where $f(n)$ denotes the sampling function.

The sampling function may be used by a UE 115 (e.g., UE 115-a) to generate a set of sequences from the DFT or IDFT matrix. The sampling function used by the UE 115 may ensure that $\{f(n)\}_{0 \leq n \leq N-1}$ (e.g., $f(n)$ 310) has a roughly equal number of odd and even numbers. For example, the sampling function may generate a set of integers for each sequence, and the set of integers may substantially comprise an equal number of even integers and odd integers. More specifically, given a sampling function $f(\cdot)$: $\{0, \ldots, N-1\} \to \{0, \ldots, M-1\}$, $n_{even}$ and $n_{odd}$ may represent a number of even and odd numbers, respectively, among all the values of $f(n)$ for $n=0, \ldots, N-1$. Further, by definition, $n_{even}+n_{odd}=N$. Thus, the number of even and odd integers may be roughly equal when $|n_{even}-n_{odd}| \ll N$, where «denotes "much smaller than." As described herein, there may be a number of different types of possible sampling functions. A sampling function may be a quadratic sampling function, a cubic sampling function, a Fibonacci-type sampling function, or another type of sampling function.

A UE 115 may use one of these sampling functions or another type of sampling function to select a sequence from a set of possible sequences, such as from the DFT matrix 300 of sequences. The sequences selected using the sampling functions may include beneficial cross-correlation properties. For example, the maximum cross correlation $$\frac{1}{N} \max_{l \neq l'} |x_l^H x_{l'}|$$

of a sequence sampled with one of the above equations may be close to the maximum cross correlation of a random partial DFT/IDFT based sequence or independent and identically distributed (IID) Gaussian sequences with similar values of N and M For example, for $\{N=168, M=2048\}$I, the maximum cross correlation value with sampling function 1, 2, or 3 may be 0.18, where the maximum cross correlation value for a random partial DFT sampling function may be equal to 0.2.

The sequences generated by UE 115 may also correspond to a low RIC. For example, A may be the N×M matrix formed by stacking M sequences together, where the sequence $x_l$ is defined as the $l^{th}$ column of A. The RIC of orders $s \geq 2$, $\delta_s$ is the smallest $\delta > 0$ such that for all s-sparse $x \in \mathbb{C}^M$, there may be $$(1-\delta) \leq \frac{\|Ax\|^2}{\|x\|^2} \leq (1+\delta).$$

In this case, the RICs of the matrix of the described sequences may be comparable to random partial DFT/IDFT matrices.

The sequences generated by the UE 115 may also correspond to a higher probability of sequence detection at the receiver after the UE 115 transmits the preamble based on the sequences to a base station 105. FFT and IFFT may be used instead of matrix/vector multiplication, which may increase efficiency in sequence generation. FFT and IFFT may increase the speed of the sequence computation when compared to vector multiplication processes.

The sequence pool generation process performed by the UE 115 based on the deterministic sampling may be modified further to generate further sequences set or pools of sequences. The sequence pool generation process may be modified by multiplying each sequence in the pool with a common sequence of length N. The multiplication may be an example of point-wise multiplication. For example, two sequences a and b, may both have length N. The point-wise multiplication of a and b may be given by:

$$[a(0)b(0), a(1)b(1), \ldots, a(N-1)b(N-1)].$$

In an example of modifying the sequence pool by multiplying by a common sequence, b may be selected as the common sequence, and may be selected with unit power elements, such that $|b(n)|=1$. For example:

$$b=[1,-1,1,-1,\ldots,1,-1], b(n)=\exp(j \bmod(n,2)*\pi)$$

$$b=[1,j,1,-j,\ldots,1,j,1,-j], b(n)=\exp(j \bmod(n,4)*\pi/2)$$

$$b=[1,-j,1,j, \ldots ,1,-j,1,j], \text{ i.e., } b(n)=\exp(j \bmod(n,4)*3\pi/2)$$

where b may be chosen such that it may reduce the PAPR of the sequences in the sequence pool (i.e., sequence masking).

In some cases, sequence masking may be used to generate other sequence pools (e.g., codebooks) from a first sequence pool. For instance, given a first sequence pool, a second sequence pool may be generated by performing sequence masking with a masking sequence b.

Thus, there may be an extended number of options of sequences for a UE 115 to select from (randomly, in some cases) for the UE 115 to use for the first message of the random access procedure. This may decrease the likelihood of two UEs 115 selecting the same sequence, for example, for random access messaging.

Figure 4:
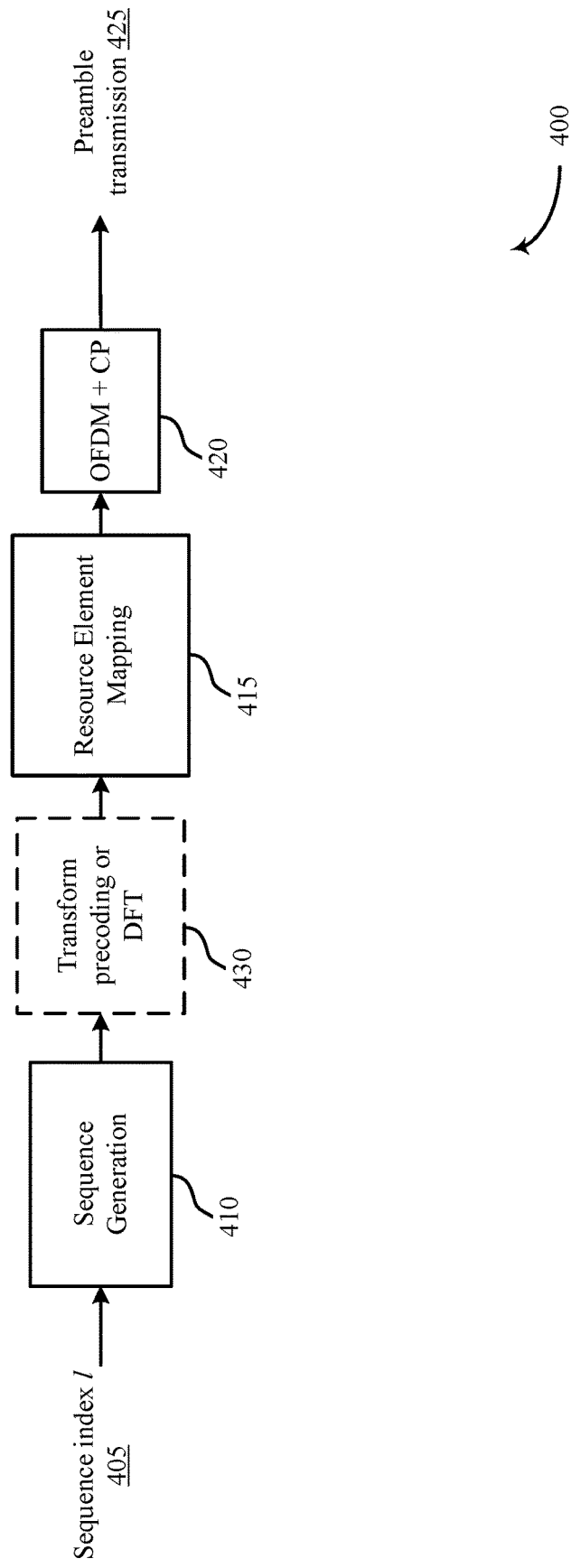
FIG. 4 illustrates an example of a process diagram that supports partial DFT-based sequence design and application to random access channel preambles in accordance with aspects of the present disclosure.

FIG. 4 illustrates an example of a process diagram 400 that supports partial DFT-based sequence design and application to random access channel preambles in accordance with aspects of the present disclosure. In some examples, process diagram 400 may implement aspects of wireless communications systems 100 or 200. For example, a UE 115 as described with respect to FIGS. 1, 2, and 3 may utilize process diagram 400 to generate and transmit a preamble 425.

The sequence pools generated by the UE 115 as described with respect to FIGS. 2 and 3 may be used to generate preambles for random access procedure preambles transmitted in a RACH. The preambles may be used as part of a two-step random access procedure, a four-step random access procedure, or another type of random access procedure. The sequence masking techniques may be used to generate cell specific sequences. For example, a first cell A may use a masking sequence $b_A$ and a second cell B may use a masking sequence $b_B$. The sequences generated may be transmitted in time domain or frequency domain.

Process diagram 400 may illustrate one example of the process of generating and transmitting a preamble sequence. Sequence index 1. 405 may be determined based on a DFT/IDFT matrix identified by a UE 115. The sequence may then be generated at 410, according to the process described with respect to wireless communications system 200 and DFT matrix 300. The sequence may then undergo RE mapping 415 at by a UE 115. The UE 115 may map the sequence to REs to transmit the sequence. The UE 115 may then multiplex the symbols of the sequence, and add a cyclic prefix at 420. Finally, the UE 115 may transmit the preamble 425.

In some cases, after generating the sequence at 410, the UE 115 may perform a transform precoding or DFT at 430 so that the UE 115 may transmit the preamble in the time domain. If the UE 115 does not apply transform precoding or DFT at 430, the UE 115 may transmit the preamble 425 in the frequency domain. The ability to transmit preamble 425 in the time domain or the frequency domain may provide additional flexibility which may improve efficient resource utilization and further decrease the likelihood of transmission interference between multiple UEs 115 transmitting random access preambles.

In some cases, interleaving may be applied after the sequence is generated at 410 and before the RE mapping 415. One example of interleaving may be block interleaving. Block interleaving may be performed by writing the sequence into a table, column first and row second, as shown below with an example sequence S(0), . . . , S(27), and interleaving of size 7 by 4:

| S (0)  | S (1)  | S (2)  | S (3)  |
|--------|--------|--------|--------|
| S (4)  | S (5)  | S (6)  | S (7)  |
| S (8)  | S (9)  | S (10) | S (11) |
| S (12) | S (13) | . . .  | . . .  |
| S (16) | . . .  | . . .  | . . .  |
| S (20) | . . .  | . . .  | . . .  |
| S (24) | S (25) | . . .  | S (27) |

The table may then be read row first column second by the UE 115.

Thus, the interleaved sequence, t(0), . . . , t(27) may be equal to [s(0), s(4), . . . s(24), s(1), s(5), s(9), . . . , s(25), s(2), s(6), . . . s(3), s(7), . . . , s(27)].

In some cases, the size of the interleaver may be a prime number. For example, for a given sequence N, a number may be picked that may correspond to the smallest prime number $N_1$ that is greater than $\sqrt{N}$ to be the column length of the block interleaver, and then select $N_1$ to be the smallest prime number such that $N_1N_2 \geq N$. If $N_1N_2 \geq N$, when the sequence is written into the table, zeroes may be inserted at the end of the table (e.g., insert $N_1N_2-N$ zeroes). Then, the zeroes may be discarded when reading the sequence out from the table to obtain a new, interleaved sequence.

Interleaving may be used to further reduce PAPR. Other types of interleaving may be used to reduce PAPR or to provide further variations on the generated sequence that may further decrease likelihood of commonalities with other sequences transmitted by other UEs 115.

Figure 5:
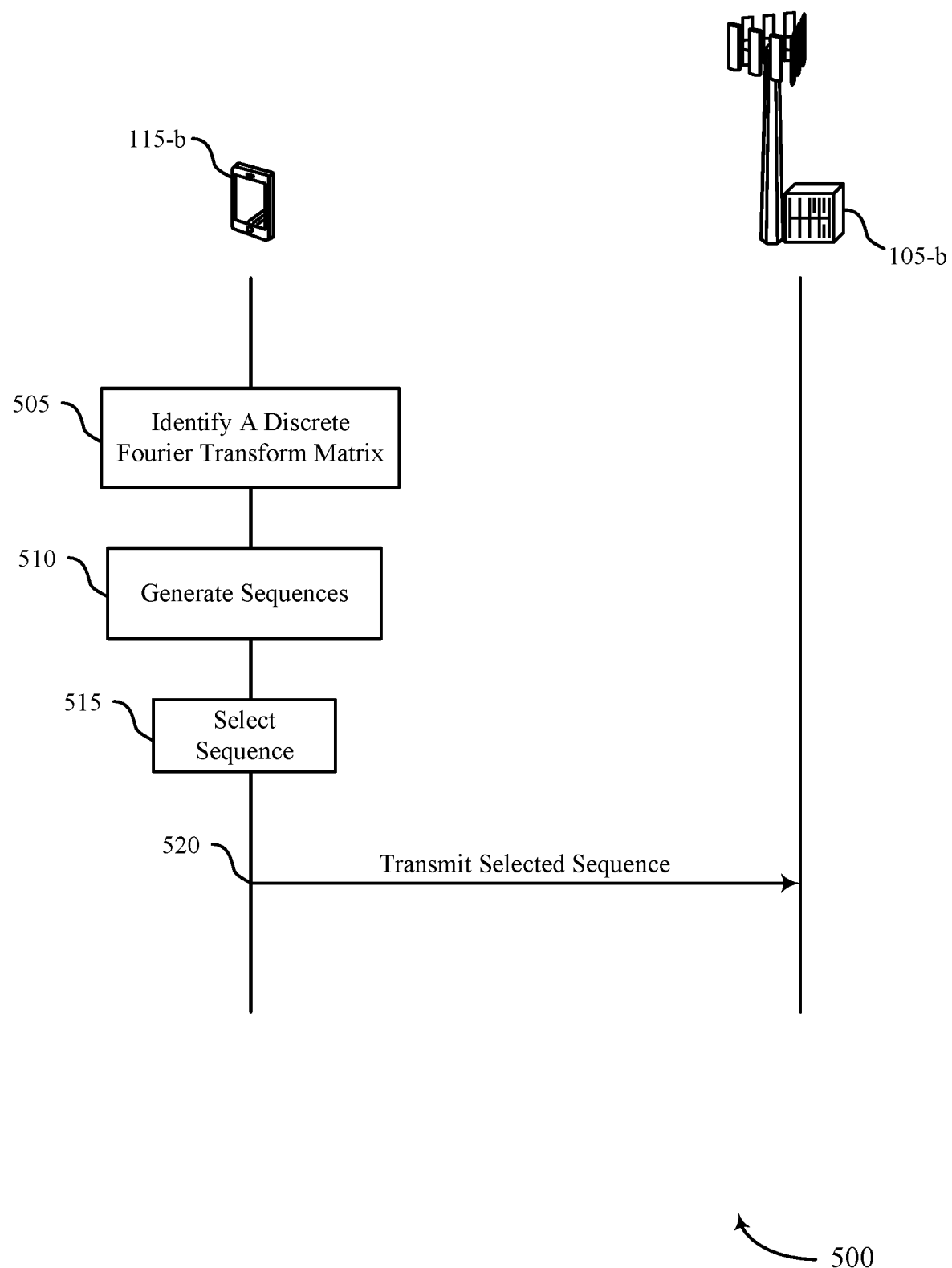
FIG. 5 illustrates an example of a process flow in a system that supports partial DFT-based sequence design and application to random access channel preambles in accordance with aspects of the present disclosure.

FIG. 5 illustrates an example of a process flow 500 in a system that supports partial DFT-based sequence design and application to random access channel preambles in accordance with aspects of the present disclosure. In some examples, process flow 500 may implement aspects of wireless communications systems 100 or 200. Process flow 500 may include base station 105-b, which may be an example of a base station 105-a or base station 105 as described with respect to FIGS. 1 and 2. Process flow 500 may also include UE 115-b which may be an example of UE 115-a or a UE 115 as described with respect to FIGS. 1 and 2. UE 115-b may generate and transmit a preamble sequence as described with respect to FIGS. 3 and 4.

At 505, UE 115-b may identify a DFT matrix. In some cases, the DFT matrix may be a square matrix, where a number of sequences in the set of sequences may be less than or equal to an order of the DFT matrix. In some cases, the DFT matrix may be an IDFT matrix.

At 510, UE 115-b may generate a set of sequences based on the DFT matrix. Each sequence of the set of sequences may be generated by selecting a column of the DFT matrix, and performing deterministic sampling of respective entries from the selected column in accordance with a sampling function.

In some cases, UE 115-b may generate a set of integers for each sequence of the set of sequences using the sampling function. In these cases, the set of integers may substantially comprise an equal number of even integers and odd integers.

The generation of the set of sequences based on the DFT matrix at 510 may include identifying a set of columns of the discrete DFT matrix, and selecting, from the set of columns, a subset of columns for generating the set of sequences. Each sequence of the set of sequences may be generated using a column from the subset of columns.

In some cases, UE 115-b may identify that the sampling function may include a quadratic sampling function having the form:

$$f(n) = \left(a \cdot \frac{n(n+b)}{2} + c\right) \bmod M$$

where M may be an order of the DFT matrix, and where a and b each may be a positive odd number and c may be a non-negative integer. The order of the DFT matrix may be equivalent to the size of the DFT matrix, where a matrix of size M×M has an order of M.

In other cases, UE 115-b may identify that the sampling function is a cubic sampling function having the form:

$$f(n) = \left(a \frac{n(n+1)(2n+1)}{2} + b\right) \bmod M$$

where M may be an order of the DFT matrix, and where a may be a positive odd number and b may be a non-negative integer.

In other cases, UE 115-b may identify that the sampling function is a Fibonacci-type sampling function having the form:

$$f(n) = (f(n-1) + f(n-2)) \bmod M$$

where M may be an order of the DFT matrix, and where $f(0)$ and $f(1)$ of the sampling function may be a pair of integers, where a first integer of the pair may be even and a second integer of the pair may be odd.

At 515, UE 115-b may select a sequence from the set of sequences, based on generating the sequences at 510. UE 115-b may perform sequence masking for each sequence of the set of sequences. The selected sequence may be modified in accordance with the sequence masking prior to transmission of the selected sequence at 520. The performance of the sequence masking may include multiplying each sequence with a masking sequence that may have the same length as each corresponding sequence. The masking sequence may modify a PAPR of each sequence in the set of sequences from a first value to a second value that may be less than the first value.

In some cases, the set of sequences may include a set of cell-specific sequences that may be based on the sequence masking. The selection of the sequence may be based on communicating with the wireless device in a cell that may correspond to the set of cell-specific sequences.

UE 115-b may perform interleaving of each sequence of the set of sequences. The selected sequence may be modified in accordance with the interleaving prior to the transmission of the sequence at 520. The interleaving performed by UE 115-b may in some cases be an example of block interleaving. The interleaving may be performed using an interleaver that has a size that may be equal to a prime number, and the prime number may be selected based on a length of each sequence. The interleaving may modify a PAPR of each sequence in the set of sequences from a first value to a second value that is less than the first value.

At 520, UE 115-*b* may transmit the selected sequences to a wireless device (e.g., base station 105-*b*). UE 115-*b* may transmit the selected sequence as part of a preamble for a random access procedure. The transmission of the selected sequence may include transmitting the selected sequence as a frequency domain sequence, a tome domain sequence, or a combination of these. Although these aspects are described with reference to a random access procedure, the sequences generated for wireless transmissions may be applied to other types of sequence-based transmissions. Thus, the examples of the DFT/IDFT-based random access preamble is used for illustrative purposes and should not be considered limiting.

Figure 6:
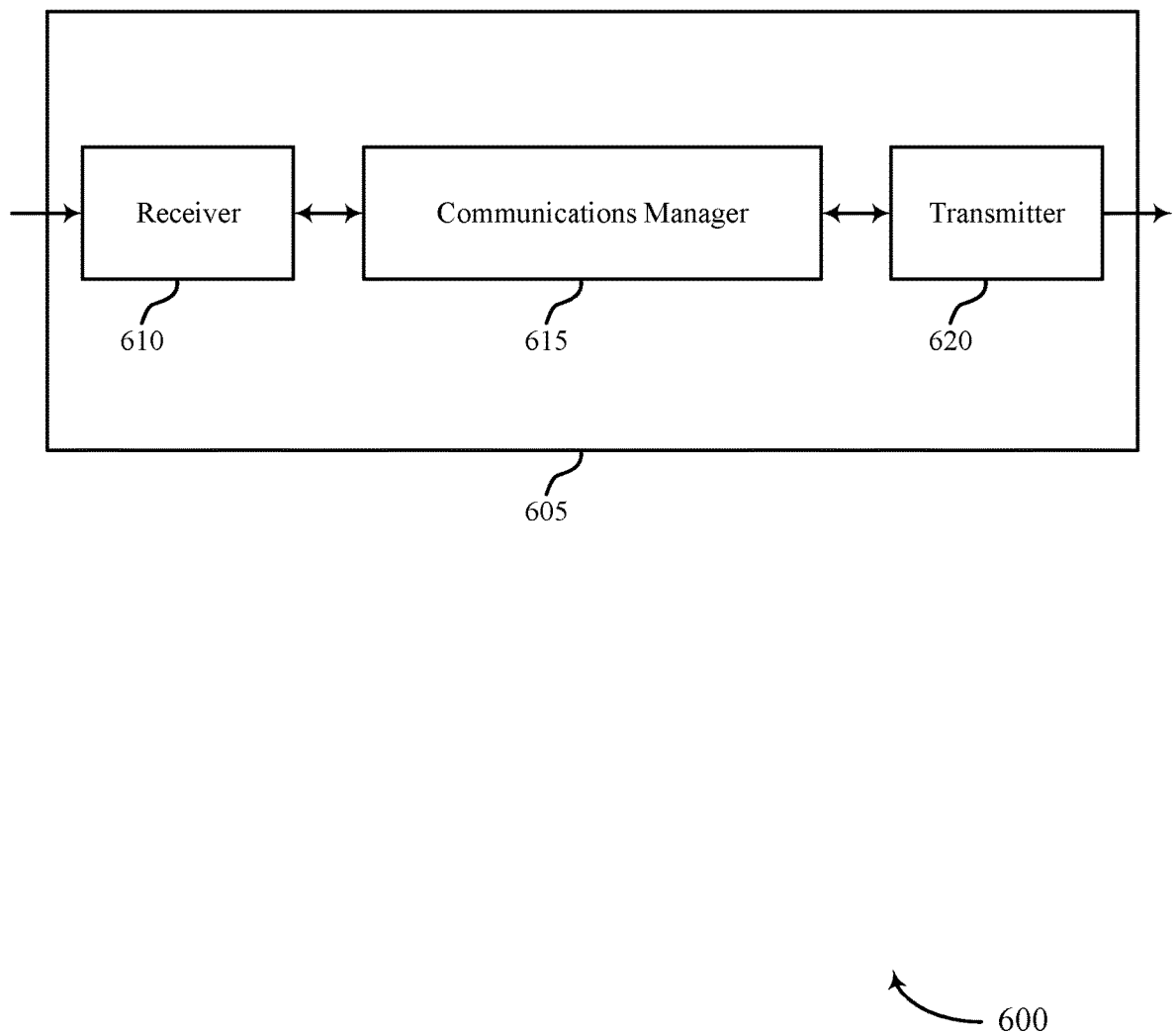
FIGS. 6 and 7 show block diagrams of devices that support partial DFT-based sequence design and application to random access channel preambles in accordance with aspects of the present disclosure.

FIG. 6 shows a block diagram 600 of a device 605 that supports partial DFT-based sequence design and application to random access channel preambles in accordance with aspects of the present disclosure. The device 605 may be an example of aspects of a UE 115 or base station 105 as described herein. The device 605 may include a receiver 610, a communications manager 615, and a transmitter 620. The device 605 may also include a processor. Each of these components may be in communication with one another (e.g., via one or more buses).

Receiver 610 may receive information such as packets, user data, or control information associated with various information channels (e.g., control channels, data channels, and information related to partial DFT-based sequence design and application to random access channel preambles, etc.). Information may be passed on to other components of the device 605. The receiver 610 may be an example of aspects of the transceiver 920 or 1020 as described with reference to FIGS. 9 and 10. The receiver 610 may utilize a single antenna or a set of antennas.

The communications manager 615 may identify a DFT matrix, select a sequence from the set of sequences based on generating the set of sequences, generate a set of sequences based on the DFT matrix, where each sequence of the set of sequences is generated by selecting a column of the DFT matrix and performing deterministic sampling of respective entries from the selected column in accordance with a sampling function. The communications manager 615 may transmit the selected sequence to a wireless device. The communications manager 615 may be an example of aspects of the communications manager 910 or 1010 as described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 620 may transmit signals generated by other components of the device 605. In some examples, the transmitter 620 may be collocated with a receiver 610 in a transceiver module. For example, the transmitter 620 may be an example of aspects of the transceiver 920 or 1020 as described with reference to FIGS. 9 and 10. The transmitter 620 may utilize a single antenna or a set of antennas.

In some examples, the communications manager 615 described herein may be implemented as a chipset of a wireless modem, and the receiver 610 and the transmitter 620 may be implemented as sets of analog components (e.g., amplifiers, filters, phase shifters, antennas, etc.). The wireless modem may obtain and decode signals from the receiver 610 over a receive interface, and may output signals for transmission to the transmitter 620 over a transmit interface.

The actions performed by the communications manager 615 as described herein may be implemented to realize one or more potential advantages. One implementation may allow a UE 115 to save power and increase battery life by avoiding excessive retransmissions of random access preambles. The communications manager 615 may control transmitter 620 to transmit preambles that may be generated to avoid interference and overlap with transmissions by other UEs 115, which may improve communications reliability at the UE 115.

Figure 7:
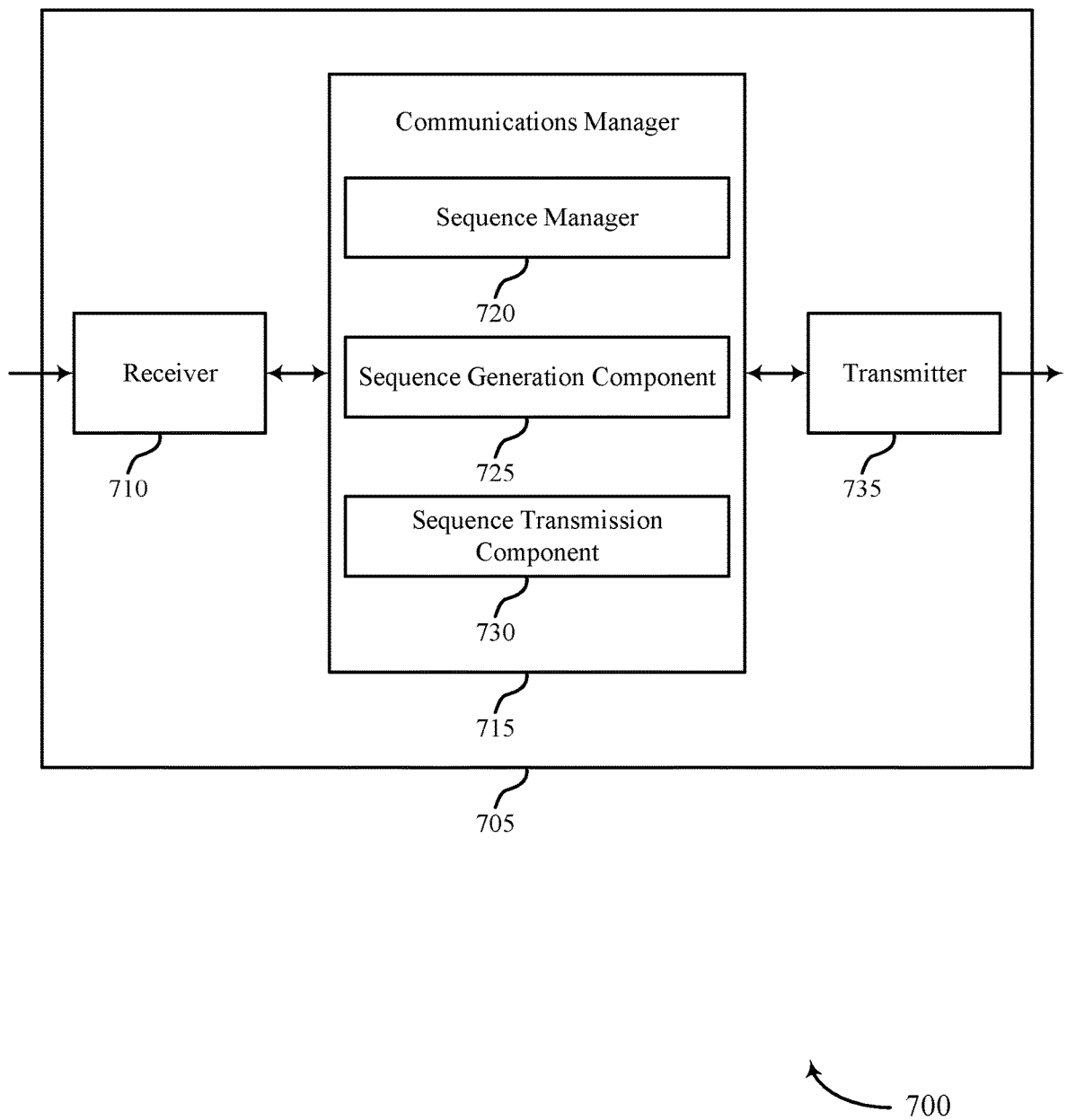

FIG. 7 shows a block diagram 700 of a device 705 that supports partial DFT-based sequence design and application to random access channel preambles in accordance with aspects of the present disclosure. The device 705 may be an example of aspects of a device 605, a UE 115, or a base station 105 as described herein. The device 705 may include a receiver 710, a communications manager 715, and a transmitter 735. The device 705 may also include a processor. Each of these components may be in communication with one another (e.g., via one or more buses).

Receiver 710 may receive information such as packets, user data, or control information associated with various information channels (e.g., control channels, data channels, and information related to partial DFT-based sequence design and application to random access channel preambles, etc.). Information may be passed on to other components of the device 705. The receiver 710 may be an example of aspects of the transceiver 920 or 1020 as described with reference to FIGS. 9 and 10. The receiver 710 may utilize a single antenna or a set of antennas.

The communications manager 715 may be an example of aspects of the communications manager 615 as described herein. The communications manager 715 may include a sequence manager 720, a sequence generation component 725, and a sequence transmission component 730. The communications manager 715 may be an example of aspects of the communications manager 910 or 1010 as described herein.

The sequence manager 720 may identify a DFT matrix and select a sequence from the set of sequences based on generating the set of sequences. The sequence generation component 725 may generate a set of sequences based on the DFT matrix, where each sequence of the set of sequences is generated by selecting a column of the DFT matrix and performing deterministic sampling of respective entries from the selected column in accordance with a sampling function. The sequence transmission component 730 may transmit the selected sequence to a wireless device.

Transmitter 735 may transmit signals generated by other components of the device 705. In some examples, the transmitter 735 may be collocated with a receiver 710 in a transceiver module. For example, the transmitter 735 may be an example of aspects of the transceiver 920 or 1020 as described with reference to FIGS. 9 and 10. The transmitter 735 may utilize a single antenna or a set of antennas.

A processor of a UE 115 (e.g., controlling the receiver 710, transmitter 740, or transceiver 920) may efficiently generate a sequence based on a DFT matrix that may be transmitter by transmitter 740. The processor of the UE 115 may turn on or off processing units to generate the sequence, which may decrease interference with transmissions by other UEs 115. The processor of the UE 115 may also turn on or of processing units to transmit the sequence using transmitter 740, which may be a part of a random access procedure to initiate communication with a base station 105 outside of scheduled resources, which may further improve efficiency.

Figure 8:
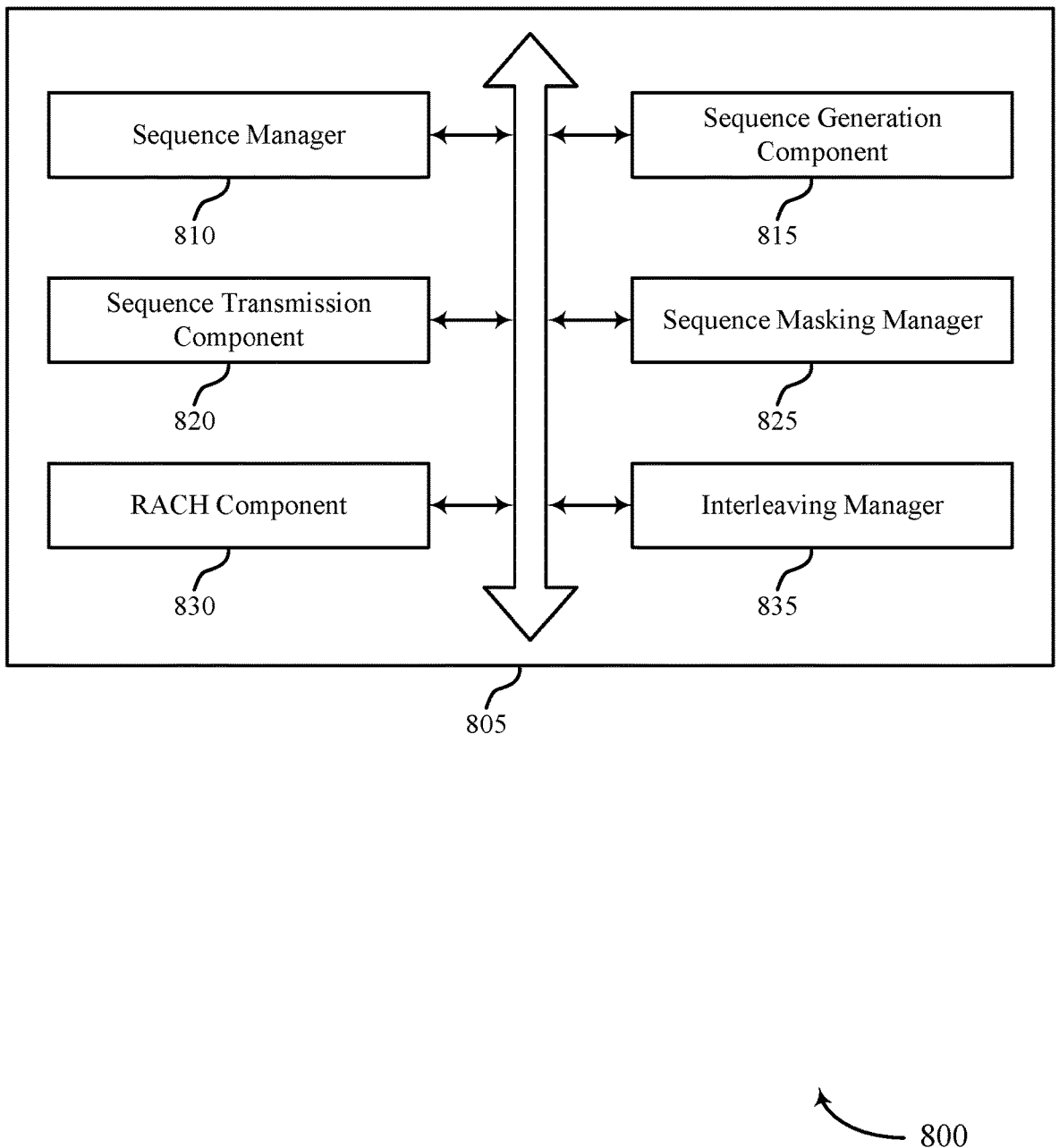
FIG. 8 shows a block diagram of a communications manager that supports partial DFT-based sequence design and application to random access channel preambles in accordance with aspects of the present disclosure.

FIG. 8 shows a block diagram 800 of a communications manager 805 that supports partial DFT-based sequence design and application to random access channel preambles in accordance with aspects of the present disclosure. The communications manager 805 may be an example of aspects of a communications manager 615, a communications manager 715, or a communications manager 910 described herein. The communications manager 805 may include a sequence manager 810, a sequence generation component 815, a sequence transmission component 820, a sequence masking manager 825, a RACH component 830, and an interleaving manager 835. Each of these modules may communicate, directly or indirectly, with one another (e.g., via one or more buses).

The sequence manager 810 may identify a DFT matrix. In some examples, the sequence manager 810 may select a sequence from the set of sequences based on generating the set of sequences. In some examples, the sequence manager 810 may identify a set of columns of the DFT matrix. In some examples, the sequence manager 810 may select, from the set of columns, a subset of columns for generating the set of sequences, where each sequence of the set of sequences is generated using a column from the subset of columns. In some cases, the DFT matrix includes a square matrix, and where a number of sequences in the set of sequences is less than or equal to an order of the DFT matrix. In some cases, the DFT matrix includes an IDFT matrix.

The sequence generation component 815 may generate a set of sequences based on the DFT matrix, where each sequence of the set of sequences is generated by selecting a column of the DFT matrix and performing deterministic sampling of respective entries from the selected column in accordance with a sampling function. In some examples, the sequence generation component 815 may generate a set of integers for each sequence of the set of sequences using the sampling function, and where the set of integers substantially includes an equal number of even integers and odd integers.

In some examples, the sequence generation component 815 may identify that the sampling function includes a quadratic sampling function having the form $$f(n) = \left(a \cdot \frac{n(n+b)}{2} + c\right) \bmod M,$$

where M is an order of the DFT matrix, and where a and b each are a positive odd number and c is a non-negative integer.

In some examples, the sequence generation component 815 may identify that the sampling function includes a cubic sampling function having the form $$f(n) = \left(a \frac{n(n+1)(2n+1)}{2} + b\right) \bmod M,$$

where M is an order of the DFT matrix, and where a is a positive odd number and b is a non-negative integer.

In some examples, the sequence generation component 815 may identify that the sampling function includes a Fibonacci-type sampling function having the form $f(n) = (f(n-1) + f(n-2)) \bmod M$, where M is an order of the DFT matrix, and where $f(0)$ and $f(1)$ of the sampling function are a pair of integers, a first integer of the pair being even and a second integer of the pair being odd.

In some examples, the sequence generation component 815 may determine an order of the DFT matrix based on an amount or a number of sequences in the set of sequences, where the set of sequences is based on the order of the DFT matrix.

The sequence transmission component 820 may transmit the selected sequence to a wireless device. In some examples, the sequence transmission component 820 may transmit the selected sequence as a frequency domain sequence, a time domain sequence, or a combination thereof.

The sequence masking manager 825 may perform sequence masking for each sequence of the set of sequences, where the selected sequence is modified in accordance with the sequence masking prior to transmission. In some examples, the sequence masking manager 825 may multiply each sequence with a masking sequence having a same length as each corresponding sequence. In some cases, the masking sequence modifies a peak-to-average power ratio of each sequence in the set of sequences from a first value to a second value that is less than the first value. In some cases, the set of sequences includes a set of cell-specific sequences based on the sequence masking, where selecting the sequence is based on communicating with the wireless device in a cell corresponding to the set of cell-specific sequences.

The RACH component 830 may transmit the selected sequence as part of a preamble for a random access procedure. The random access procedure may be a two-step random access procedure or a four-step random access procedure. The interleaving manager 835 may perform interleaving of each sequence of the set of sequences, where the selected sequence is modified in accordance with the interleaving prior to transmission. In some cases, the interleaving includes block interleaving.

In some cases, the interleaving is performed using an interleaver having a size that is equal to a prime number, where the prime number is selected based on a length of each sequence. In some cases, the interleaving modifies a peak-to-average power ratio of each sequence in the set of sequences from a first value to a second value that is less than the first value.

Figure 9:
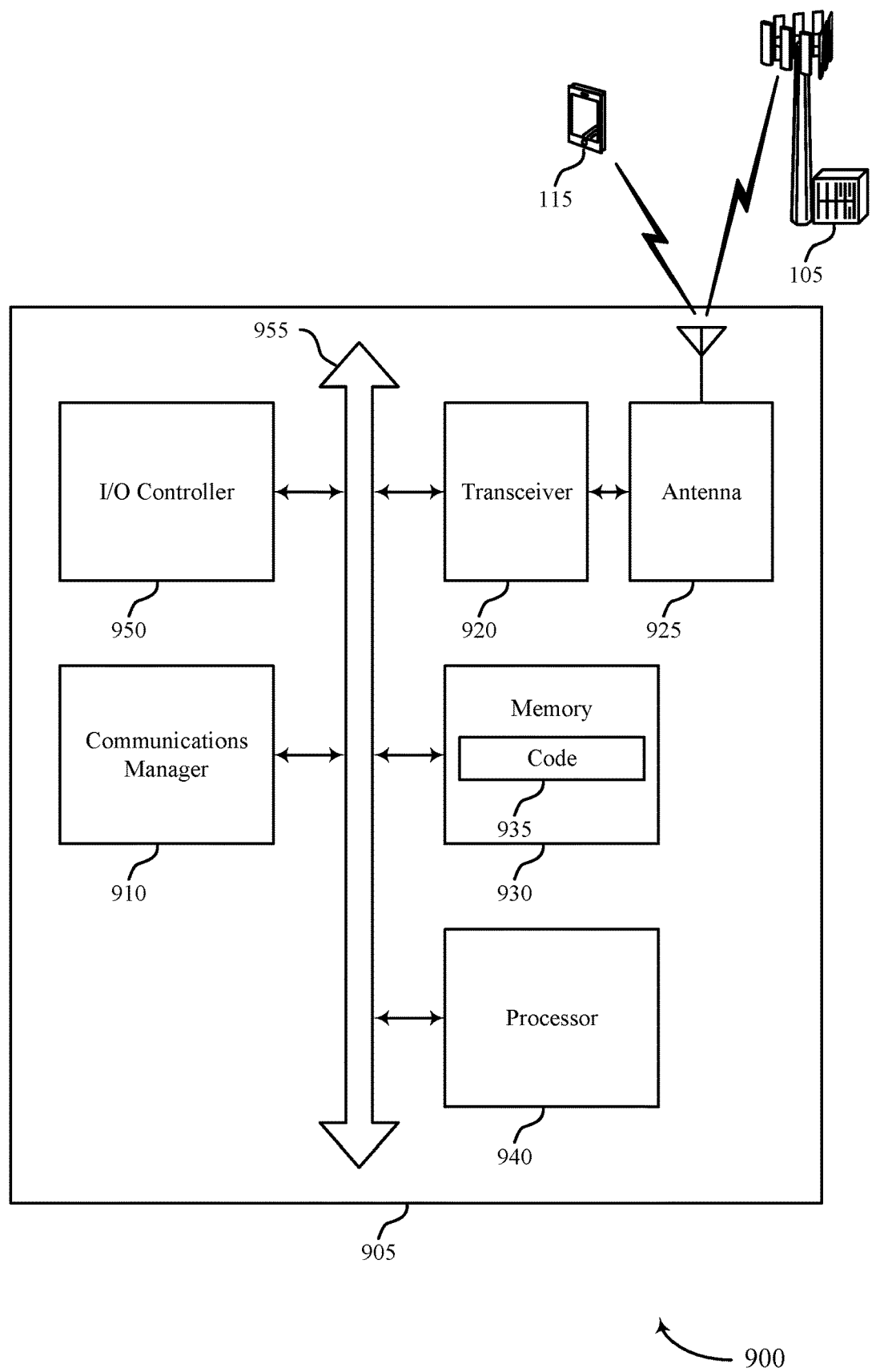
FIG. 9 shows a diagram of a system including a user equipment (UE) that supports partial DFT-based sequence design and application to random access channel preambles in accordance with aspects of the present disclosure.

FIG. 9 shows a diagram of a system 900 including a device 905 that supports partial DFT-based sequence design and application to random access channel preambles in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, a transceiver 920, an antenna 925, memory 930, a processor 940, and an I/O controller 950. These components may be in electronic communication via one or more buses (e.g., bus 955).

The communications manager 910 may identify a DFT matrix, select a sequence from the set of sequences based on generating the set of sequences, generate a set of sequences based on the DFT matrix, where each sequence of the set of sequences is generated by selecting a column of the DFT matrix and performing deterministic sampling of respective entries from the selected column in accordance with a sampling function. The communications manager 910 may transmit the selected sequence to a wireless device.

Transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM), read-only memory (ROM), or a combination thereof. The memory 930 may store computer-readable code 935 including instructions that, when executed by a processor (e.g., the processor 940) cause the device to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting partial DFT-based sequence design and application to random access channel preambles).

The I/O controller 950 may manage input and output signals for the device 905. The I/O controller 950 may also manage peripherals not integrated into the device 905. In some cases, the I/O controller 950 may represent a physical connection or port to an external peripheral. In some cases, the I/O controller 950 may utilize an operating system such as iOS®, ANDROID®, MS-DOS®, MS-WINDOWS®, OS/2®, UNIX®, LINUX®, or another known operating system. In other cases, the I/O controller 950 may represent or interact with a modem, a keyboard, a mouse, a touchscreen, or a similar device. In some cases, the I/O controller 950 may be implemented as part of a processor. In some cases, a user may interact with the device 905 via the I/O controller 950 or via hardware components controlled by the I/O controller 950.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
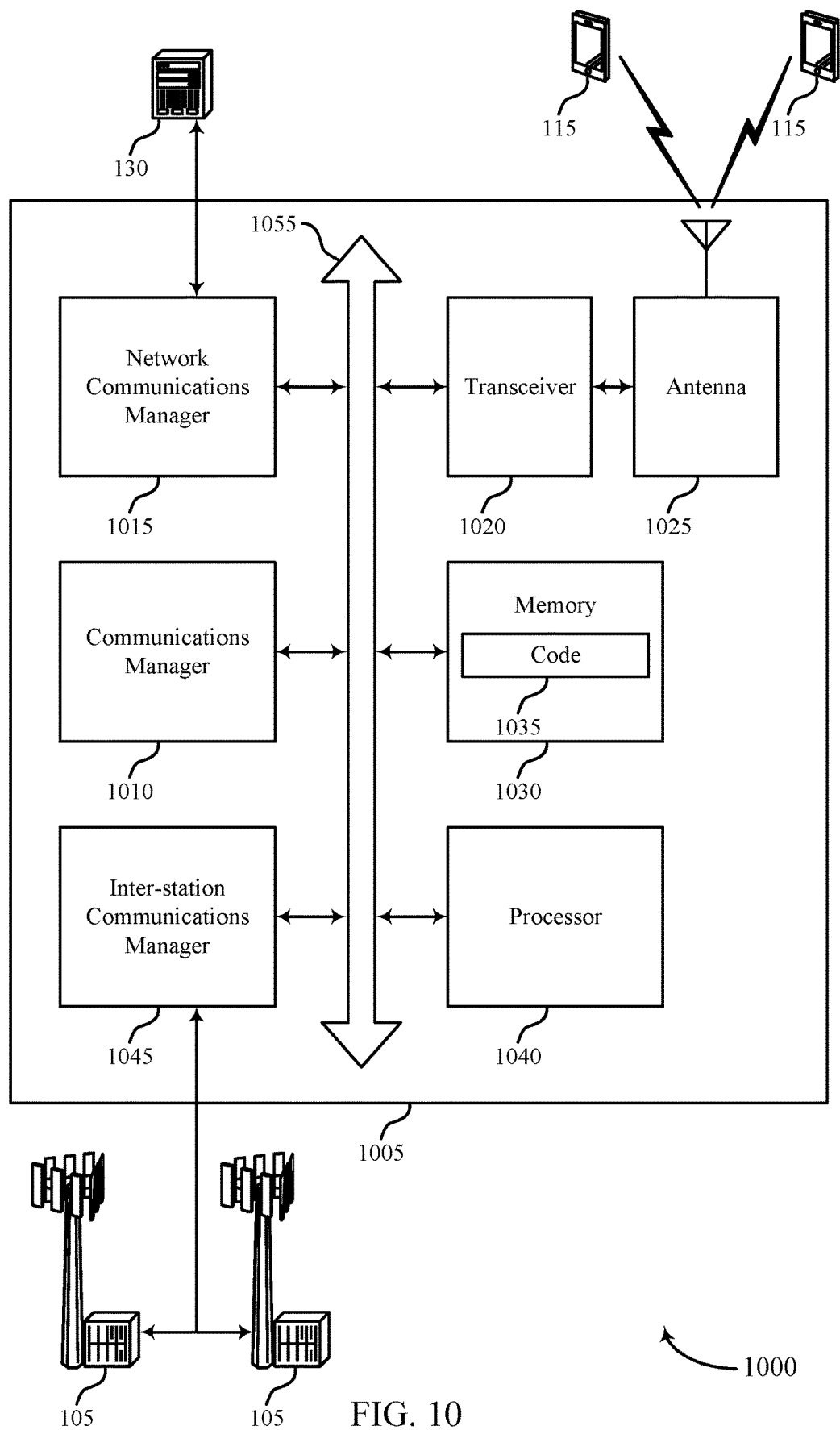
FIG. 10 shows a diagram of a system including a base station that supports partial DFT-based sequence design and application to random access channel preambles in accordance with aspects of the present disclosure.

FIG. 10 shows a diagram of a system 1000 including a device 1005 that supports partial DFT-based sequence design and application to random access channel preambles in accordance with aspects of the present disclosure. The device 1005 may be an example of or include the components of device 605, device 705, or a base station 105 as described herein. The device 1005 may include components for bi-directional voice and data communications including components for transmitting and receiving communications, including a communications manager 1010, a network communications manager 1015, a transceiver 1020, an antenna 1025, memory 1030, a processor 1040, and an inter-station communications manager 1045. These components may be in electronic communication via one or more buses (e.g., bus 1055).

The communications manager 1010 may identify a DFT matrix, select a sequence from the set of sequences based on generating the set of sequences, generate a set of sequences based on the DFT matrix, where each sequence of the set of sequences is generated by selecting a column of the DFT matrix and performing deterministic sampling of respective entries from the selected column in accordance with a sampling function. The communications manager 1010 may transmit the selected sequence to a wireless device.

Network communications manager 1015 may manage communications with the core network (e.g., via one or more wired backhaul links). For example, the network communications manager 1015 may manage the transfer of data communications for client devices, such as one or more UEs 115.

Transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting partial DFT-based sequence design and application to random access channel preambles).

Inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
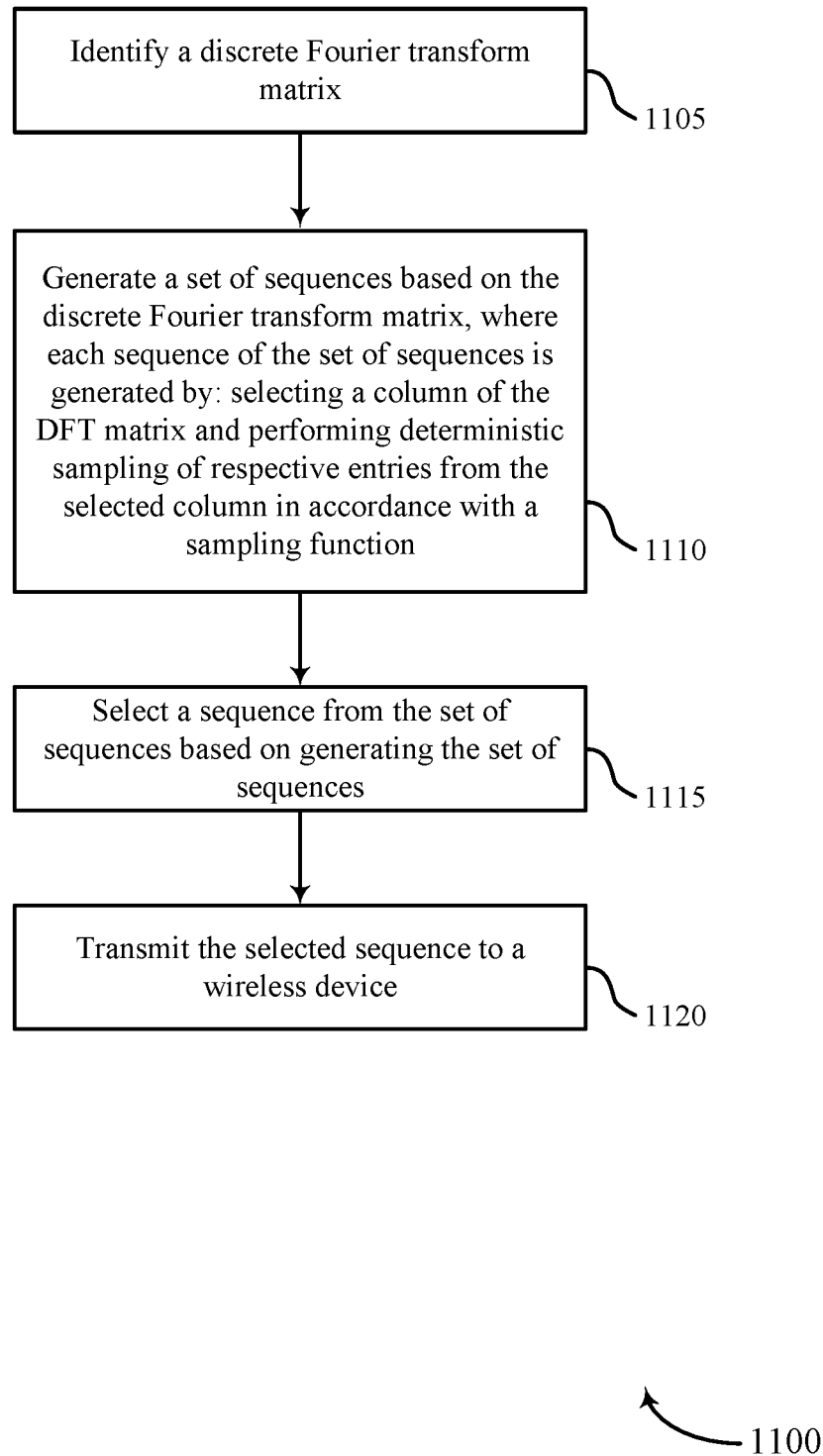
FIGS. 11 through 13 show flowcharts illustrating methods that support partial DFT-based sequence design and application to random access channel preambles in accordance with aspects of the present disclosure.

FIG. 11 shows a flowchart illustrating a method 1100 that supports partial DFT-based sequence design and application to random access channel preambles in accordance with aspects of the present disclosure. The operations of method 1100 may be implemented by a UE 115 or base station 105 or its components as described herein. For example, the operations of method 1100 may be performed by a communications manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1105, the UE or base station may identify a DFT matrix. The operations of 1105 may be performed according to the methods described herein. In some examples, aspects of the operations of 1105 may be performed by a sequence manager as described with reference to FIGS. 6 through 10.

At 1110, the UE or base station may generate a set of sequences based on the DFT matrix, where each sequence of the set of sequences is generated by selecting a column of the DFT matrix and performing deterministic sampling of respective entries from the selected column in accordance with a sampling function. The operations of 1110 may be performed according to the methods described herein. In some examples, aspects of the operations of 1110 may be performed by a sequence generation component as described with reference to FIGS. 6 through 10.

At 1115, the UE or base station may select a sequence from the set of sequences based on generating the set of sequences. The operations of 1115 may be performed according to the methods described herein. In some examples, aspects of the operations of 1115 may be performed by a sequence manager as described with reference to FIGS. 6 through 10.

At 1120, the UE or base station may transmit the selected sequence to a wireless device. The operations of 1120 may be performed according to the methods described herein. In some examples, aspects of the operations of 1120 may be performed by a sequence transmission component as described with reference to FIGS. 6 through 10.

Figure 12:
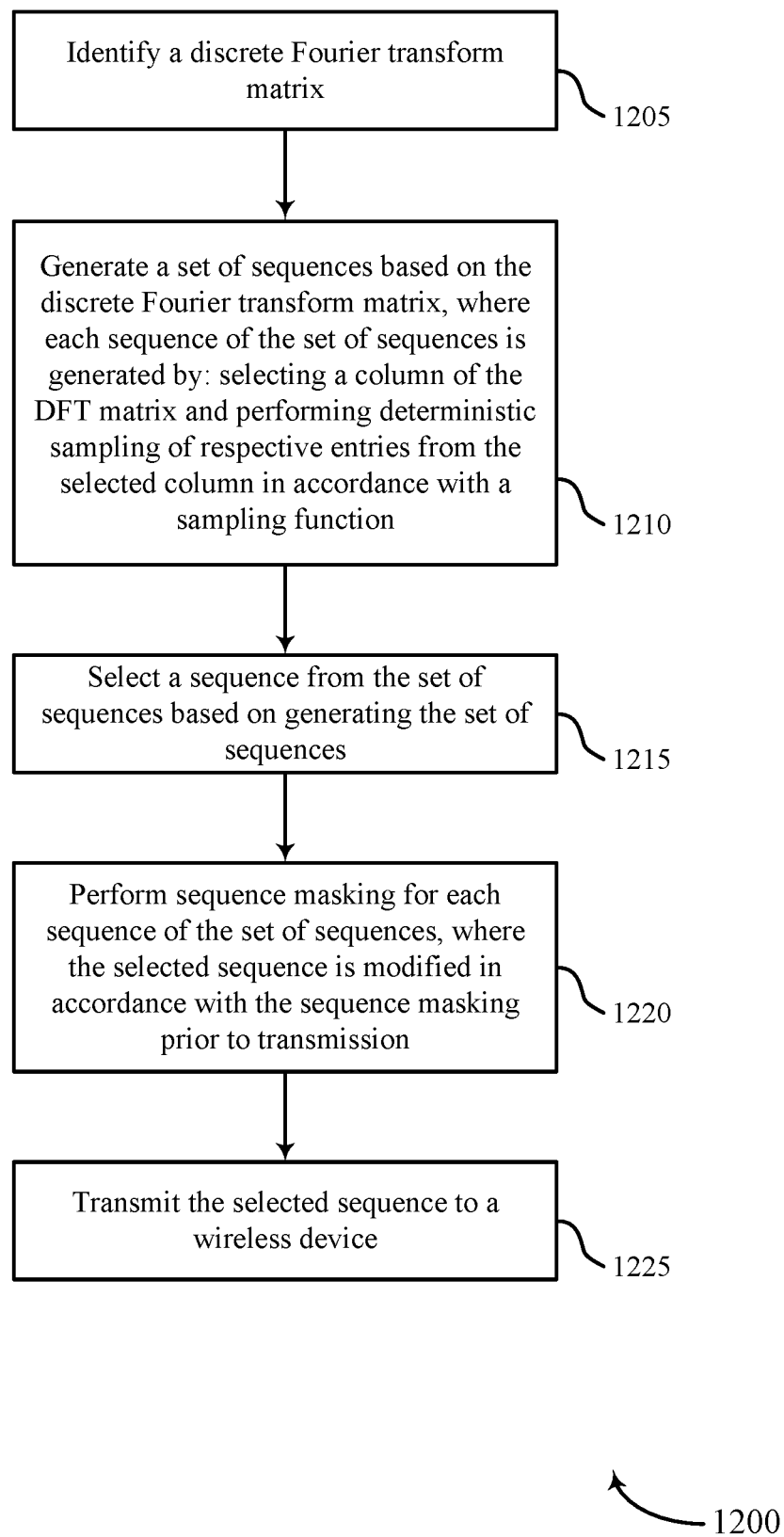

FIG. 12 shows a flowchart illustrating a method 1200 that supports partial DFT-based sequence design and application to random access channel preambles in accordance with aspects of the present disclosure. The operations of method 1200 may be implemented by a UE 115 or base station 105 or its components as described herein. For example, the operations of method 1200 may be performed by a communications manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1205, the UE or base station may identify a DFT matrix. The operations of 1205 may be performed according to the methods described herein. In some examples, aspects of the operations of 1205 may be performed by a sequence manager as described with reference to FIGS. 6 through 10.

At 1210, the UE or base station may generate a set of sequences based on the DFT matrix, where each sequence of the set of sequences is generated by selecting a column of the DFT matrix and performing deterministic sampling of respective entries from the selected column in accordance with a sampling function. The operations of 1210 may be performed according to the methods described herein. In some examples, aspects of the operations of 1210 may be performed by a sequence generation component as described with reference to FIGS. 6 through 10.

At 1215, the UE or base station may select a sequence from the set of sequences based on generating the set of sequences. The operations of 1215 may be performed according to the methods described herein. In some examples, aspects of the operations of 1215 may be performed by a sequence manager as described with reference to FIGS. 6 through 10.

At 1220, the UE or base station may perform sequence masking for each sequence of the set of sequences, where the selected sequence is modified in accordance with the sequence masking prior to transmission. The operations of 1220 may be performed according to the methods described herein. In some examples, aspects of the operations of 1220 may be performed by a sequence masking manager as described with reference to FIGS. 6 through 10.

At 1225, the UE or base station may transmit the selected sequence to a wireless device. The operations of 1225 may be performed according to the methods described herein. In some examples, aspects of the operations of 1225 may be performed by a sequence transmission component as described with reference to FIGS. 6 through 10.

Figure 13:
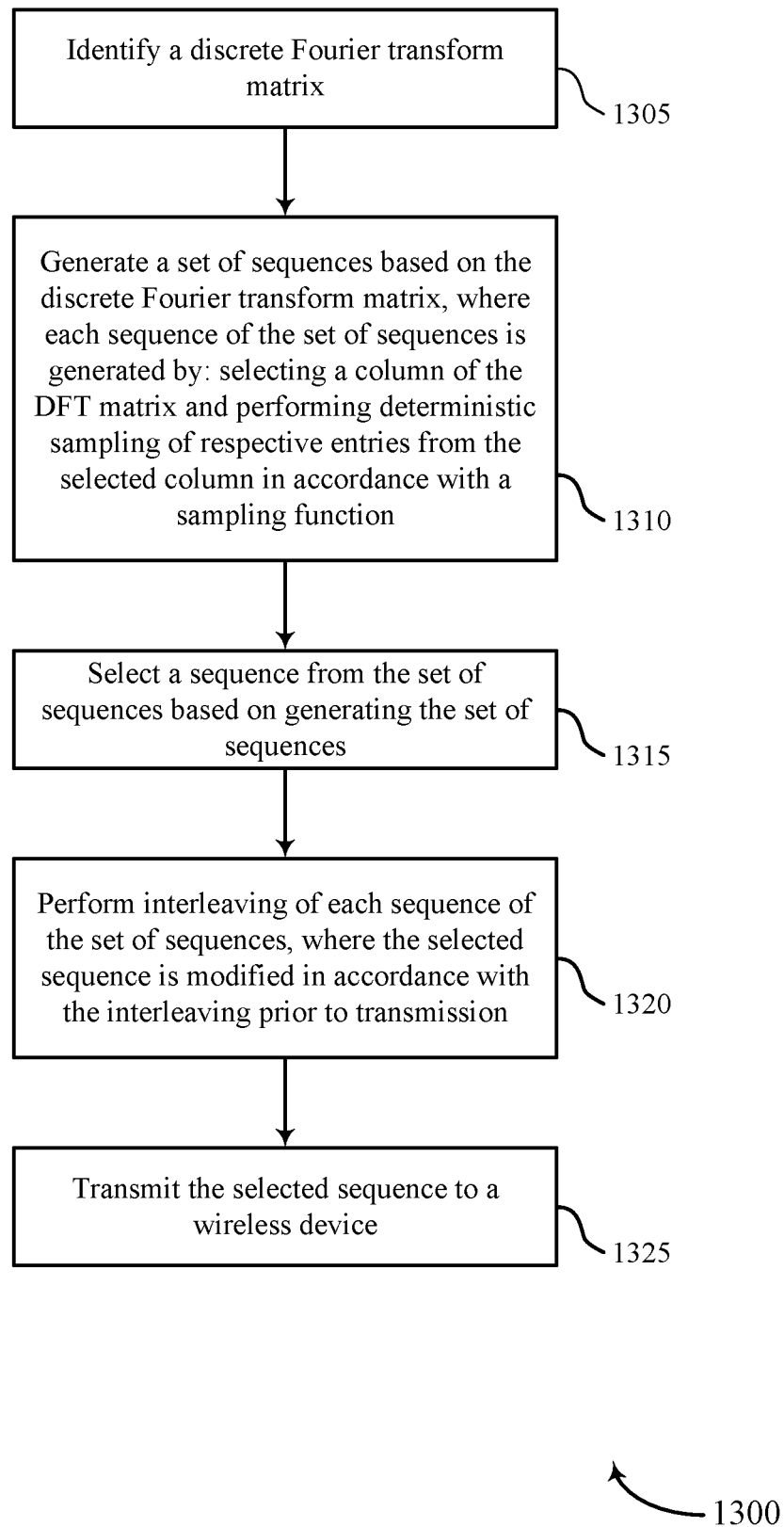

FIG. 13 shows a flowchart illustrating a method 1300 that supports partial DFT-based sequence design and application to random access channel preambles in accordance with aspects of the present disclosure. The operations of method 1300 may be implemented by a UE 115 or base station 105 or its components as described herein. For example, the operations of method 1300 may be performed by a communications manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1305, the UE or base station may identify a DFT matrix. The operations of 1305 may be performed according to the methods described herein. In some examples, aspects of the operations of 1305 may be performed by a sequence manager as described with reference to FIGS. 6 through 10.

At 1310, the UE or base station may generate a set of sequences based on the DFT matrix, where each sequence of the set of sequences is generated by selecting a column of the DFT matrix and performing deterministic sampling of respective entries from the selected column in accordance with a sampling function. The operations of 1310 may be performed according to the methods described herein. In some examples, aspects of the operations of 1310 may be performed by a sequence generation component as described with reference to FIGS. 6 through 10.

At 1315, the UE or base station may select a sequence from the set of sequences based on generating the set of sequences. The operations of 1315 may be performed according to the methods described herein. In some examples, aspects of the operations of 1315 may be performed by a sequence manager as described with reference to FIGS. 6 through 10.

At 1320, the UE or base station may perform interleaving of each sequence of the set of sequences, where the selected sequence is modified in accordance with the interleaving prior to transmission. The operations of 1320 may be performed according to the methods described herein. In some examples, aspects of the operations of 1320 may be performed by an interleaving manager as described with reference to FIGS. 6 through 10.

At 1325, the UE or base station may transmit the selected sequence to a wireless device. The operations of 1325 may be performed according to the methods described herein. In some examples, aspects of the operations of 1325 may be performed by a sequence transmission component as described with reference to FIGS. 6 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a discrete Fourier transform matrix;
generating a set of sequences based at least in part on the discrete Fourier transform matrix, wherein each sequence of the set of sequences is generated by:
selecting a column of the discrete Fourier transform matrix; and
performing deterministic sampling of respective entries from the selected column in accordance with a sampling function;
selecting a sequence from the set of sequences based at least in part on generating the set of sequences; and
transmitting the selected sequence to a wireless device.

2. The method of claim 1, further comprising:
generating a set of integers for each sequence of the set of sequences using the sampling function, and wherein the set of integers substantially comprises an equal number of even integers and odd integers.

3. The method of claim 1, further comprising:
identifying that the sampling function comprises a quadratic sampling function having a form $$f(n) = \left(a \cdot \frac{n(n+b)}{2} + c\right) \bmod M,$$

wherein M comprises an order of the discrete Fourier transform matrix, and wherein a and b each comprise a positive odd number and c and n each comprise a non-negative integer.

4. The method of claim 1, further comprising:
identifying that the sampling function comprises a cubic sampling function having a form $$f(n) = \left(a \frac{n(n+1)(2n+1)}{2} + b\right),$$

wherein M comprises an order of the discrete Fourier transform matrix, and wherein a comprises a positive odd number and b and n each comprise a non-negative integer.

5. The method of claim 1, further comprising:
identifying that the sampling function comprises a Fibonacci-type sampling function having a form $f(n)=(f(n-1)+f(n-2)) \bmod M$, wherein M comprises an order of the discrete Fourier transform matrix and n comprises a non-negative integer, and wherein $f(0)$ and $f(1)$ of the sampling function comprise a pair of integers, a first integer of the pair being even and a second integer of the pair being odd.

6. The method of claim 1, wherein generating the set of sequences based at least in part on the discrete Fourier transform matrix comprises:
determining an order of the discrete Fourier transform matrix based at least in part on a number of sequences in the set of sequences, wherein the set of sequences is based at least in part on the order of the discrete Fourier transform matrix.

7. The method of claim 1, further comprising:
performing sequence masking for each sequence of the set of sequences, wherein the selected sequence is modified in accordance with the sequence masking prior to transmission.

8. The method of claim 7, wherein performing the sequence masking comprises:
multiplying each sequence with a masking sequence having a same length as each corresponding sequence.

9. The method of claim 8, wherein the masking sequence modifies a peak-to-average power ratio of each sequence in the set of sequences from a first value to a second value that is less than the first value.

10. The method of claim 7, wherein the set of sequences comprises a set of cell-specific sequences based at least in part on the sequence masking, wherein selecting the sequence is based at least in part on communicating with the wireless device in a cell corresponding to the set of cell-specific sequences.

11. The method of claim 7, wherein transmitting the selected sequence comprises:
transmitting the selected sequence as part of a preamble for a random access procedure.

12. The method of claim 11, wherein the random access procedure is a two-step random access procedure.

13. The method of claim 11, wherein the random access procedure is a four-step random access procedure.

14. The method of claim 1, further comprising:
performing interleaving of each sequence of the set of sequences, wherein the selected sequence is modified in accordance with the interleaving prior to transmission.

15. The method of claim 14, wherein the interleaving comprises block interleaving.

16. The method of claim 14, wherein the interleaving is performed using an interleaver having a size that is equal to a prime number, wherein the prime number is selected based at least in part on a length of each sequence.

17. The method of claim 14, wherein the interleaving modifies a peak-to-average power ratio of each sequence in the set of sequences from a first value to a second value that is less than the first value.

18. The method of claim 1, wherein transmitting the selected sequence comprises:
transmitting the selected sequence as a frequency domain sequence, a time domain sequence, or a combination thereof.

19. The method of claim 1, wherein generating the set of sequences based at least in part on the discrete Fourier transform matrix comprises:
identifying a set of columns of the discrete Fourier transform matrix; and
selecting, from the set of columns, a subset of columns for generating the set of sequences, wherein each sequence of the set of sequences is generated using a column from the subset of columns.

20. The method of claim 1, wherein:
the discrete Fourier transform matrix comprises a square matrix, and wherein a number of sequences in the set of sequences is less than or equal to an order of the discrete Fourier transform matrix; or
the discrete Fourier transform matrix comprises an inverse discrete Fourier transform matrix.

21. An apparatus for wireless communication, comprising:
a processor,
memory coupled with the processor; and
instructions stored in the memory and executable by the processor to cause the apparatus to:
identify a discrete Fourier transform matrix;
generate a set of sequences based at least in part on the discrete Fourier transform matrix, wherein each sequence of the set of sequences is generated by selecting a column of the discrete Fourier transform matrix and performing deterministic sampling of respective entries from the selected column in accordance with a sampling function;
select a sequence from the set of sequences based at least in part on generating the set of sequences; and
transmit the selected sequence to a wireless device.

22. The apparatus of claim 21, wherein the instructions are further executable by the processor to cause the apparatus to:
generate a set of integers for each sequence of the set of sequences using the sampling function, and wherein the set of integers substantially comprises an equal number of even integers and odd integers.

23. The apparatus of claim 21, wherein the instructions are further executable by the processor to cause the apparatus to:
identify that the sampling function comprises a quadratic sampling function having a form $$f(n) = \left(a \cdot \frac{n(n+b)}{2} + c\right) \mod M,$$

wherein M comprises an order of the discrete Fourier transform matrix, and wherein a and b each comprise a positive odd number and c and n each comprise a non-negative integer.

24. The apparatus of claim 21, wherein the instructions are further executable by the processor to cause the apparatus to:
identify that the sampling function comprises a cubic sampling function having a form $$f(n) = \left(a \frac{n(n+1)(2n+1)}{2} + b\right) \mod M,$$

wherein M comprises an order of the discrete Fourier transform matrix, and wherein a comprises a positive odd number and b and n each comprise a non-negative integer.

25. The apparatus of claim 21, wherein the instructions are further executable by the processor to cause the apparatus to:
identify that the sampling function comprises a Fibonacci-type sampling function having a form $f(n)=(f(n-1)+f(n-2)) \mod M$, wherein M comprises an order of the discrete Fourier transform matrix and n comprises a non-negative integer, and wherein $f(0)$ and $f(1)$ of the sampling function comprise a pair of integers, a first integer of the pair being even and a second integer of the pair being odd.

26. The apparatus of claim 21, wherein the instructions are further executable by the processor to cause the apparatus to:
perform sequence masking for each sequence of the set of sequences, wherein the selected sequence is modified in accordance with the sequence masking prior to transmission.

27. The apparatus of claim 26, wherein the instructions to perform the sequence masking are executable by the processor to cause the apparatus to:
multiply each sequence with a masking sequence having a same length as each corresponding sequence.

28. The apparatus of claim 27, wherein the masking sequence modifies a peak-to-average power ratio of each sequence in the set of sequences from a first value to a second value that is less than the first value.

29. An apparatus for wireless communication, comprising:
means for identifying a discrete Fourier transform matrix;
means for generating a set of sequences based at least in part on the discrete Fourier transform matrix, wherein each sequence of the set of sequences is generated by selecting a column of the discrete Fourier transform matrix and performing deterministic sampling of respective entries from the selected column in accordance with a sampling function;
means for selecting a sequence from the set of sequences based at least in part on generating the set of sequences; and
means for transmitting the selected sequence to a wireless device.

30. A non-transitory computer-readable medium storing code for wireless communication, the code comprising instructions executable by a processor to:
identify a discrete Fourier transform matrix;
generate a set of sequences based at least in part on the discrete Fourier transform matrix, wherein each sequence of the set of sequences is generated by selecting a column of the discrete Fourier transform matrix and performing deterministic sampling of respective entries from the selected column in accordance with a sampling function;

select a sequence from the set of sequences based at least in part on generating the set of sequences; and transmit the selected sequence to a wireless device.

\* \* \* \* \*